United States Patent [19]

Nagao et al.

[11] Patent Number: 5,506,331
[45] Date of Patent: Apr. 9, 1996

[54] POLYESTER POLYMER, PRODUCTION THEREOF AND ELECTROPHOTOGRAPHIC PHOTORECEPTOR USING THE SAME

[75] Inventors: Tomohiro Nagao; Shuji Sakamoto; Hironobu Morishita; Hideyuki Miyamoto, all of Sodegaura, Japan

[73] Assignee: Idemitsu Kosan Co., Ltd., Tokyo, Japan

[21] Appl. No.: 170,236

[22] PCT Filed: Apr. 30, 1993

[86] PCT No.: PCT/JP93/00576

§ 371 Date: Dec. 28, 1993

§ 102(e) Date: Dec. 28, 1993

[87] PCT Pub. No.: WO93/22361

PCT Pub. Date: Nov. 11, 1993

[30] Foreign Application Priority Data

May 1, 1992 [JP] Japan ................................ 4-137630
Mar. 12, 1993 [JP] Japan ................................ 5-077534

[51] Int. Cl.[6] .................................................. C08G 63/18
[52] U.S. Cl. .................... 528/193; 528/96; 528/97; 528/98; 528/99; 528/102; 528/104; 528/112; 528/176; 528/272; 528/288; 528/289; 528/290; 528/291; 528/298; 528/308
[58] Field of Search ....................... 528/96, 97, 98, 528/99, 102, 104, 112, 272, 288, 289, 290, 291, 298, 308, 176, 193

[56] References Cited

U.S. PATENT DOCUMENTS 4,806,443  2/1989  Yanus et al. ........................ 430/56
5,028,687  7/1991  Yanus et al. .

FOREIGN PATENT DOCUMENTS 64-9964  1/1989  Japan .
431404  2/1992  Japan .

Primary Examiner—Samuel A. Acquah
Attorney, Agent, or Firm—Antonelli, Terry, Stout & Kraus

[57] ABSTRACT

A polyester polymer comprising repeating units (I), or repeating units (I) and (II), and having a reduced viscosity ($\eta_{sp}/c$) of 0.2 to 10.0 dl/g, measured at 20° C. as a 0.5 g/dl solution dissolved in methylene chloride is prepared by allowing a dihydric phenol (III), or dihydric phenols (III) and (IV), to react with a carbonate precursor or a dibasic acid. An electrophotographic photoreceptor which comprises an electroconductive substrate and a photosensitive layer disposed on the electroconductive substrate and containing the polyester polymer as a charge transporting material or a binder resin.

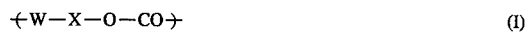

(I)

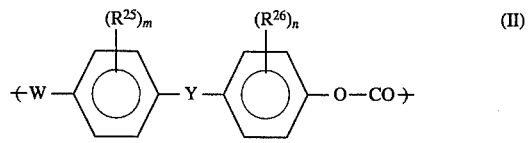

(II)

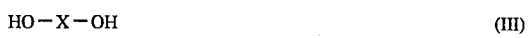

(III)

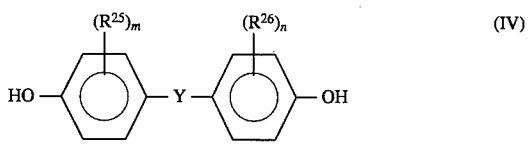

(IV)

wherein, W is —O— or single bond, X is a divalent group which is derived from a dihydric phenol containing a hydrazine structure, each of $R^{25}$ and $R^{26}$ is a halogen atom, an alkyl group, a cycloalkyl group or an aryl group, each of m and n is an integer of 0 to 4, Y is single bond, —O—, —S—, —SO—, —SO$_2$—, —CR$^{27}$R$^{28}$—, a 1,1-cycloalkylene group or an α,ω-alkylene group.

8 Claims, No Drawings

POLYESTER POLYMER, PRODUCTION THEREOF AND ELECTROPHOTOGRAPHIC PHOTORECEPTOR USING THE SAME

This application is a 371 of PCT/JP93/00576 filed Apr. 30, 1993.

TECHNICAL FIELD

The present invention relates to a novel polyester polymer, a method of preparing the polyester polymer and an electrophotographic photoreceptor produced by using the polyester polymer. Specifically, the present invention relates to a photoconductive polyester polymer of a novel structure, which is usable as a charge transporting material (as both a charge transporting material and a binder resin) or a binder resin in the photosensitive layer of electrophotographic photoreceptors, or as a material of EL devices. The present invention further relates to a method of preparing the polyester polymer and to an electrophotographic photoreceptor which is produced by using the polyester polymer and exhibits high plate wear and excellent electrophotographic properties.

TECHNICAL FIELD

G,3

Polycarbonates have been used as materials in various fields, and as their application fields have become wider, there has arisen a demand for the development of polycarbonates having improved properties.

Electrophotographic photoreceptors recently proposed and used include (1) layered-type organic electrophotographic photoreceptors (OPC), the photosensitive layer of which contains at least two layers, namely a charge generation layer (CGL) for generating charge by exposure and a charge transport layer (CTL) for transporting the charge, and (2) single-layer-type electrophotographic photoreceptors, the photosensitive layer of which is a single layer where charge generating materials and charge transporting materials are dispersed in binder resins. Polycarbonate resins derived from bisphenol A or bisphenol Z have been widely used as the binder resins contained in the charge transport layer of the layered-type electrophotographic photoreceptors and in the photosensitive layer of the single-layer-type electrophotographic photoreceptors. Since the polycarbonate resins derived from bisphenol A or bisphenol Z have good compatibility with charge transporting materials, photoreceptors whose photosensitive layer contains the polycarbonate resins are characterized by their good electrical properties and their relatively high mechanical strength.

In the conventional organic electrophotographic photoreceptors, the photoconductivity of the charge transport layer is improved by dispersing such a large amount of low molecular weight charge transporting materials in the polycarbonate binder resin as to occupy 40 to 50% by weight of the charge transport layer. This causes a problem in that the polycarbonate cannot sufficiently fulfill its function as a binder resin in improving plate wear.

In Japanese Patent Application Kokai Koho (Laid-open) Nos. 1-9964 and 4-31404 are disclosed respectively polyarylamines prepared by polymerizing an arylamine compound, which is a low molecular weight charge transporting material, and styrenic copolymers prepared by using a hydrazone compound as a comonomer. The polyarylamines and the styrenic copolymers having hydrazone units are polymers having photoconductivity themselves, and it has been proposed to solve the above-described problems by substituting them for the conventional charge transporting materials dispersed in the charge transporting layer. The use of such polymers having photoconductivity in themselves as both a charge transporting material and a binder resin in a charge transport layer seems to be effective for solving the above-described problem. However, charge transport layers formed by using the conventional photoconductive polycarbonate (polyarylamine) and styrenic copolymer having hydrazone units suffer from its insufficient plate wear. Further, even the the electrophotographic properties, which are somewhat improved as compared with those of the conventional dispersion type, are not improved sharply.

DISCLOSURE OF INVENTION

The present invention has been made under the above-described circumstances. An object of the present invention is to solve the problems by providing a polyester polymer which has a novel structure and is usable as a charge transporting material (as both a charge transporting material and a binder resin) or a binder resin in the charge transport layer of electrophotographic photoreceptors, enables easy production of electrophotographic photoreceptors the charge transport layer of which is excellent particularly in plate wear and electrophotographic properties, and is also usable in various fields of polymer materials, including the fields of electrophotographic photoreceptors.

Another object of the present invention is to provide a suitable method for preparing the polyester polymer.

Another object of the present invention is to provide an electrophotographic photoreceptor which is produced by using the polyester polymer as a charge transporting material (namely, as both a charge transporting material and a binder resin) or a binder resin and maintains high plate wear and excellent electrophotographic properties for a long term.

The inventors studied to solve the problems and consequently found that a specific polyester polymer having a hydrazone structure in repeating units was usable as both a charge transporting material and a binder resin or as a binder resin in electrophotographic photoreceptors, and they also found that the electrophotographic photoreceptors produced by using the polyester polymer were excellent in plate wear and electrophotographic properties. On the basis of the finding, the inventors has completed the present invention.

That is, the present invention provides a polyester polymer comprising repeating units (I) represented by the following general formula (I)

wherein W is —O— or single bond, X is

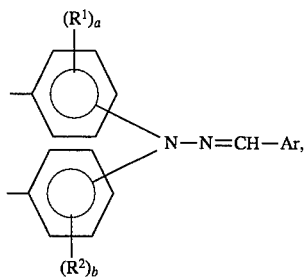

-continued
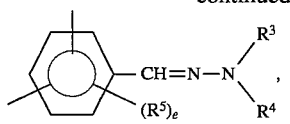
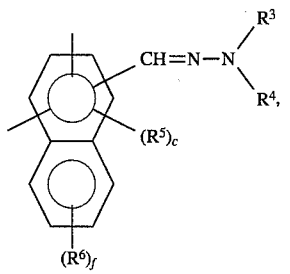
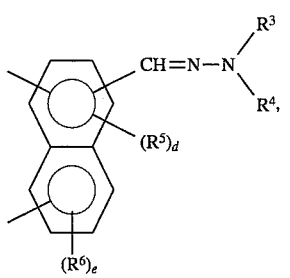
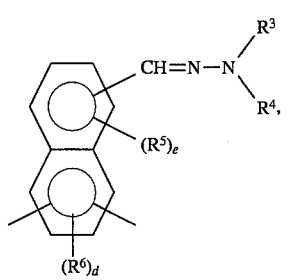
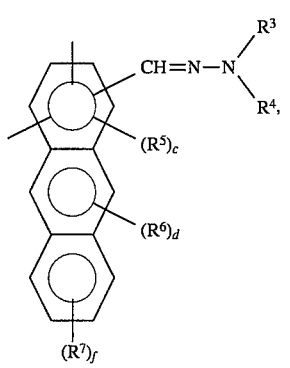
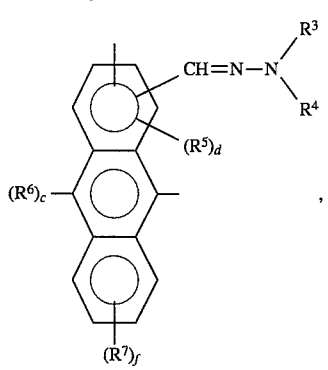
-continued
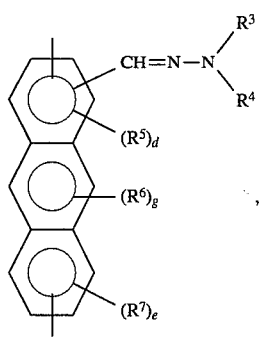
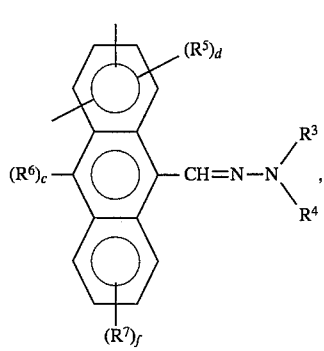
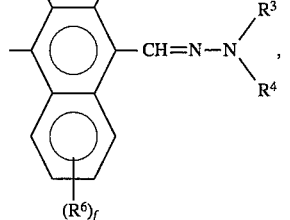
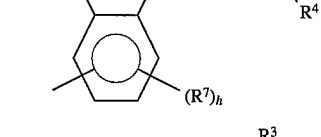
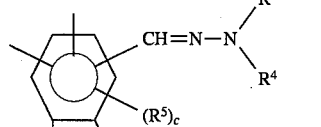
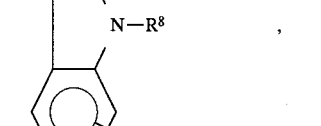

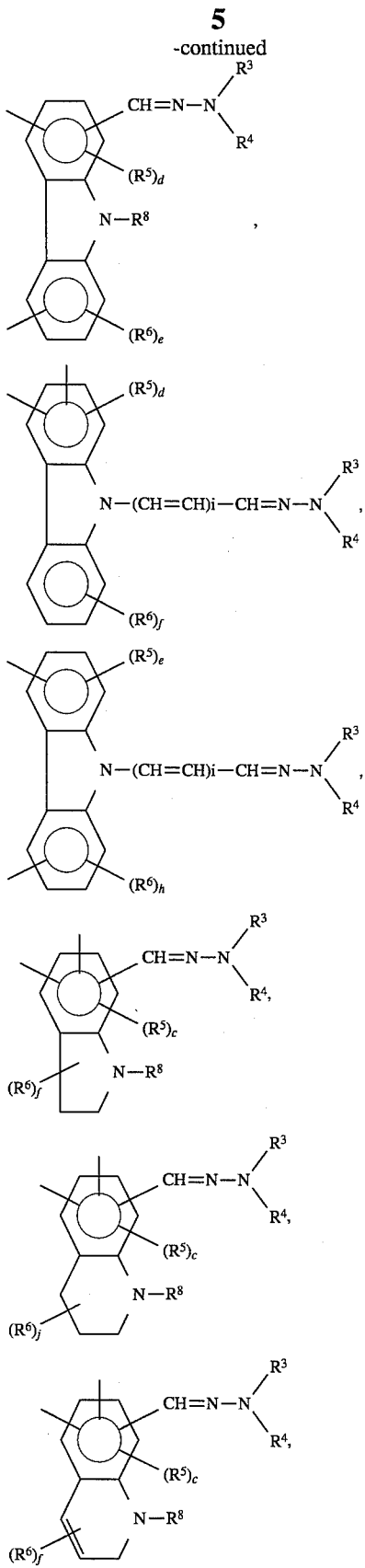
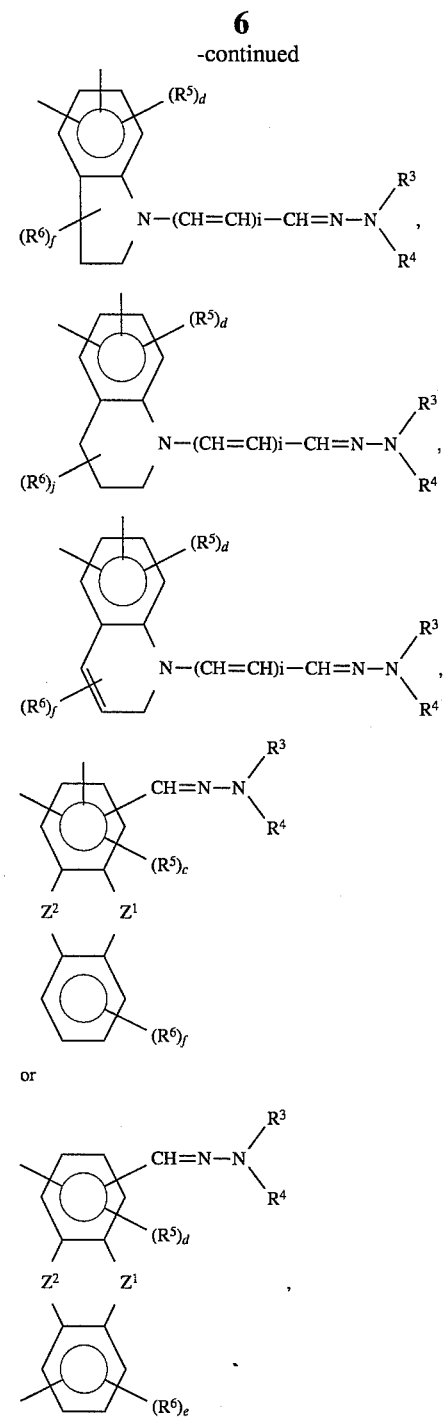
wherein each of $R^1$ and $R^2$ respectively is a halogen atom, an alkyl group of 1 to 6 carbon atoms or an aryl group of 6 to 12 carbon atoms, each of a and b respectively is an integer of 0 to 4, Ar is
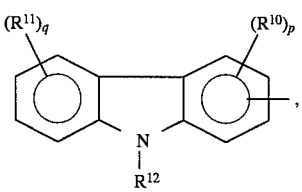

-continued
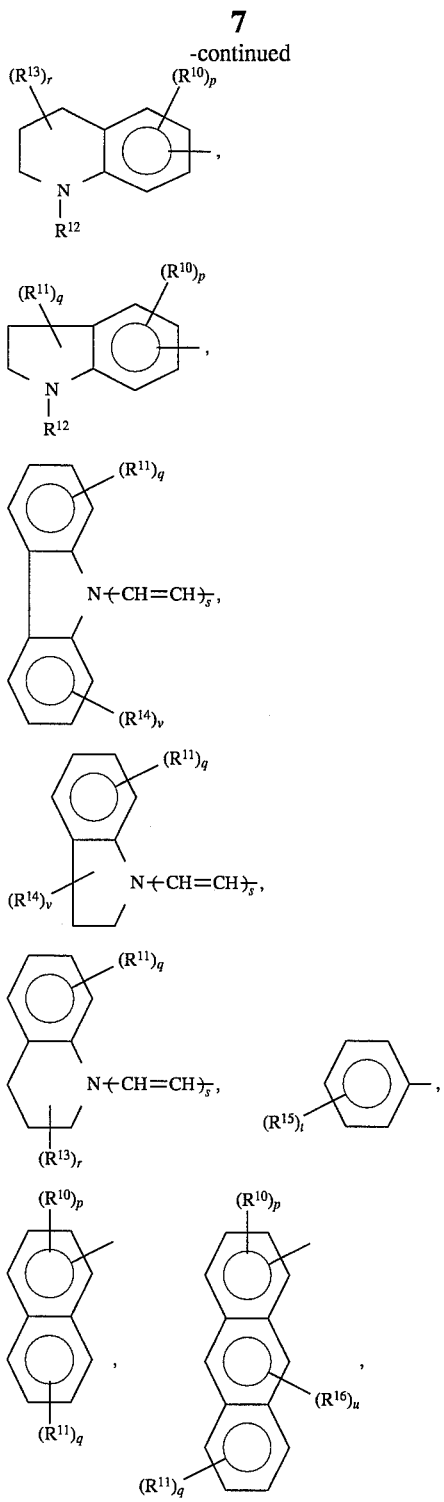
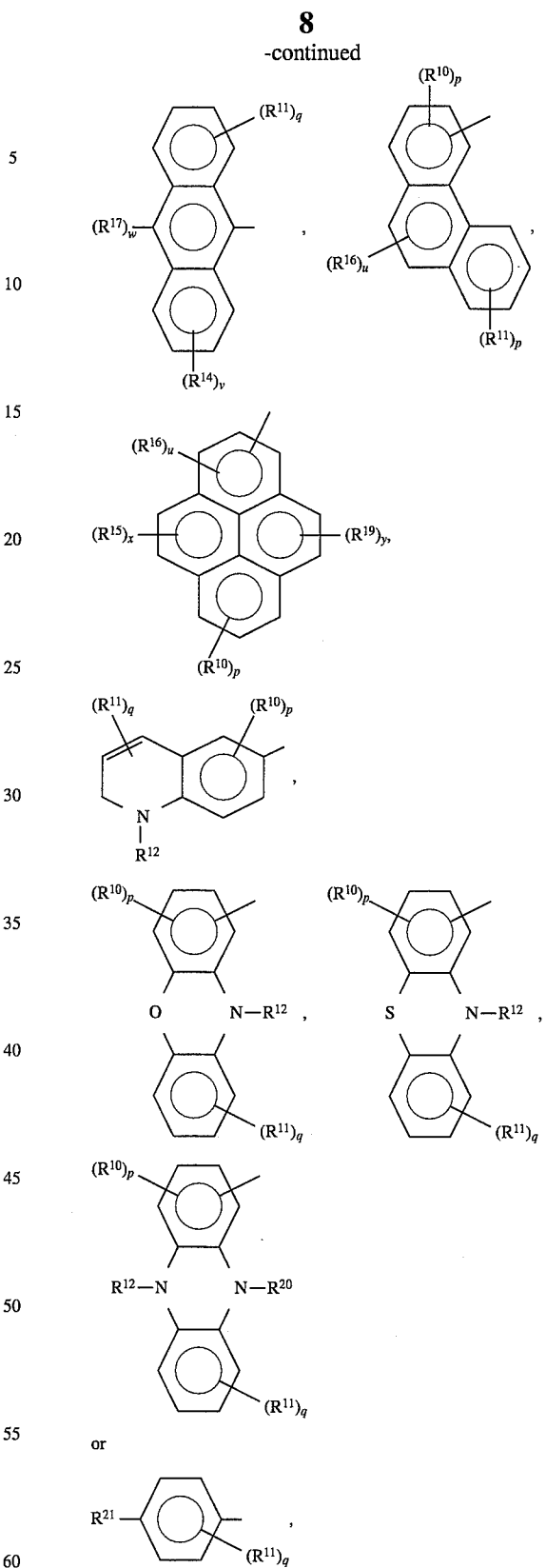
or each of $R^{10}$, $R^{11}$, $R^{13}$, $R^{14}$, $R^{15}$, $R^{16}$, $R^{17}$, $R^{18}$ and $R^{19}$ respectively being a halogen atom, an alkyl group of 1 to 6 carbon atoms or an aryl group of 6 to 12 carbon atoms, each of $R^{12}$ and $R^{20}$ respectively being hydrogen atom, an alkyl group of 1 to 20 carbon atoms or an aryl group of 6 to 18 carbon atoms, p being an integer of 0 to 3, q being an integer of 0 to 4, r being an integer of 0 to 6, s being an integer of 0 or 1, t being an integer of 0 to 5, u being an integer of 0 to 2, v being an integer of 0 to 4, w being an integer of 0 or 1, x being an integer of 0 to 2, y being an integer of 0 to 2, and $R^{21}$ being

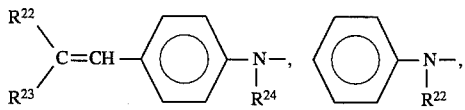

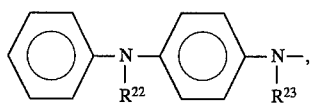

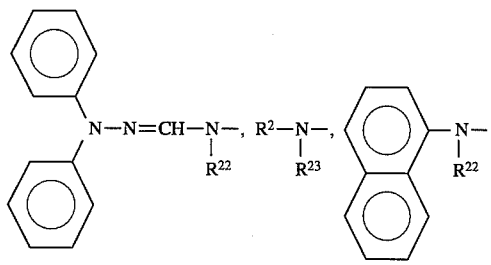

or

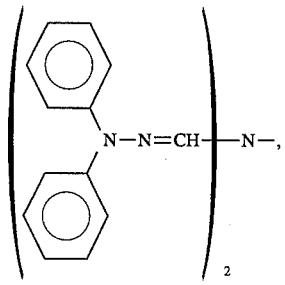

each of $R^{22}$, $R^{23}$ and $R^{24}$ respectively being hydrogen atom, an alkyl group of 1 to 20 carbon atoms or an aryl group of 6 to 18 carbon atoms, each of $R^3$ and $R^4$ respectively is hydrogen atom, an alkyl group of 1 to 10 carbon atoms or a substituted or unsubstituted aryl group of 6 to 18 carbon atoms, with the proviso that at least one of $R^3$ and $R^4$ is not hydrogen atom, each of $R^5$, $R^6$ and $R^7$ respectively is an halogen atom, cyano group, nitro group, an alkyl, alkoxyl, alkylamino or dialkylamino group of 1 to 10 carbon atoms, a substituted or unsubstituted aryl, arylamino, bisarylamino, bisaralkylamino or alkylarylamino group of 6 to 18 carbon atoms, or a substituted or unsubstituted cycloalkyl group of 5 to 7 carbon atoms, $R^8$ is hydrogen atom, an alkyl group of 1 to 10 carbon atoms or a substituted or unsubstituted aryl group of 6 to 18 carbon atoms, c is an integer of 0 or 1, d is an integer of 0 to 2, e is an integer of 0 to 3, f is an integer of 0 to 4, g is an integer of 0 to 2, h is an integer of 0 to 3, i is an integer of 0 or 1, j is an integer of 0 to 6, $Z^1$ is =$NR^8$, —S— or —O—, $Z^2$ is =$NR^9$, —S— or —O—, and $R^9$ is hydrogen atom, an alkyl group of 1 to 10 carbon atoms or a substituted or unsubstituted aryl group of 6 to 18 carbon atoms, or repeating units (I) and repeating units (II) represented by the following general formula (II)

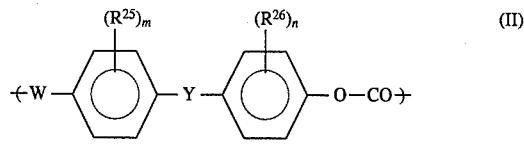

wherein W is —O— or single bond, each of $R^{25}$ and $R^{26}$ respectively is a halogen atom, an alkyl group of 1 to 6 carbon atoms, a substituted or unsubstituted cycloalkyl group of 5 to 7 carbon atoms or a substituted or unsubstituted aryl group of 6 to 12 carbon atoms, each of m and n respectively is an integer of 0 to 4, Y is single bond, —O—, —S—, —SO—, —SO$_2$—, —$CR^{27}R^{28}$—, a 1,1-cycloalkylidene group of 5 to 11 carbon atoms or an $\alpha,\omega$-alkylene group of 2 to 10 carbon atoms, each of $R^{27}$ and $R^{28}$ respectively being hydrogen atom, trifluoromethyl group an alkyl group of 1 to 6 carbon atoms or a substituted or unsubstituted aryl group of 6 to 12 carbon atoms, and having a reduced viscosity ($\eta_{sp}/c$) of 0.2 to 10.0 dl/g, measured at 20° C. as a solution of a concentration of 0.5 g/dl in methylene chloride.

The present invention further provides a method of preparing the polyester polymer comprising allowing a dihydric phenol (III) represented by the following general formula (III)

HO—X—OH    (III)

wherein X is as defined above,
or the dihydric phenol (III) and a dihydric phenol (IV) represented by the following general formula (IV)

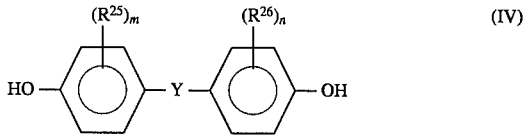

wherein $R^{25}$, $R^{26}$, m, n and Y are as defined above, to react with a carbonate precursor or a dibasic acid.

The present invention further provides an electrophotographic photoreceptor comprising an electroconductive substrate and a photosensitive layer disposed on a surface of the electroconductive substrate, characterized in that the photosensitive layer contains the polyester polymer as a charge transporting material (namely as both a charge transporting material and a binder resin) or as a binder resin.

BEST MODE FOR CARRYING OUT THE INVENTION

The polyester polymer of the present invention comprises the repeating units (I) or both the repeating units (I) and (II), and preferably contains the repeating units (I), which have a hydrazone structure, in an amount of at least 1 mol %, preferably 15 to 75 mol %, based on the total of the repeating units of the polyester polymer. If the amount of the repeating units (I) is less than 1 mol %, the photoconductivity of the polyester polymer may be insufficient for imparting satisfactory electrophotographic properties to the electrophotographic photoreceptors that are produced by using it as both a charge transporting material and a binder resin or as a binder resin.

The polyester polymer of the present invention may contain some repeating units other than those described above so far as the object of the present invention can be attained.

The polyester polymer of the present invention has a reduced viscosity ($\eta_{sp}/c$) of 0.2 to 10.0 dl/g, preferably 0.3 to 2.0 dl/g, measured at 20° C. as a solution of a concentration of 0.5 g/dl in methylene chloride. If the reduced viscosity is less than 0.2 dl/g, the mechanical strength of the polyester polymer will be poor, and particularly the surface hardness of the layer containing the polyester polymer will be insufficient, so that the photoreceptor wears down during printing and has a reduced lifetime. If the reduced viscosity is more than 10.0 dl/g, the polyester polymer will have such a high solution viscosity as to make the production of photoreceptors by solution-coating difficult.

The preferred examples of the Ar group in the general formula (I) include the followings:

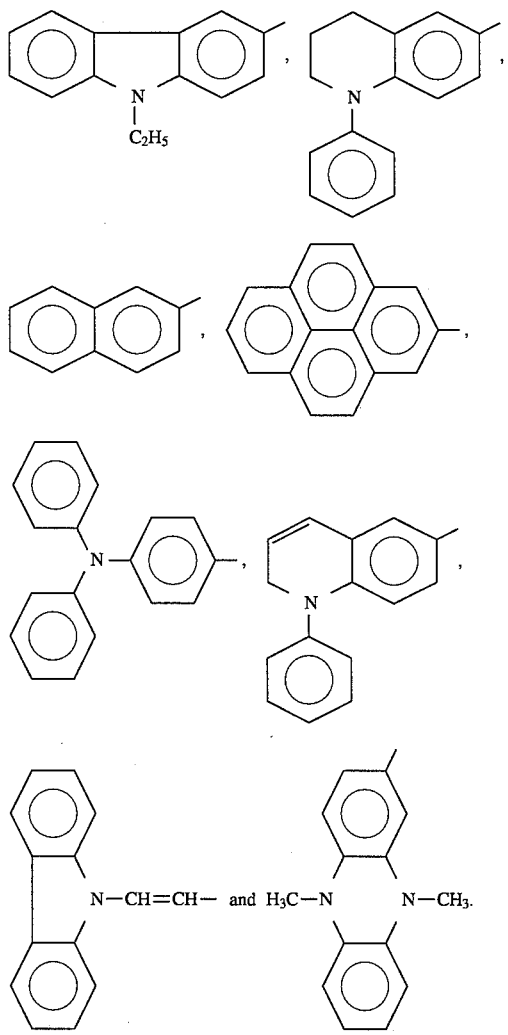

The preferred examples of the hydrazono group in the general formula (I) are those wherein each or $R^3$ and $R^4$ is methyl group or phenyl group (hereinafter, Me will represents methyl group, and Ph represents phenyl group), and particularly preferred hydrazono groups are the followings.

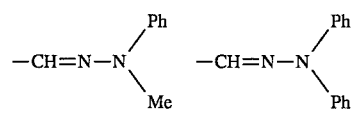

Some examples of the substituents of the substituted aryl group of 6 to 18 carbon atoms, which is an example of $R^3$ and $R^4$, include an alkyl group, an alkoxyl group, an alkylamino group, a dialkylamino group, an arylamino group, a bisarylamino group, a bisaralkylamino group and an alkylarylamino group.

The preferred examples of $R^5$, $R^6$ and $R^7$ include methyl group, ethyl group, methoxy group, ethoxy group, dimethylamino group, diethylamino group and diphenylamino group.

The preferred examples of $R^8$ and $R^9$ include methyl group, ethyl group and phenyl group.

The present invention further provides a method of preparing the polyester polymer of the present invention. Although the method of preparing the polyester polymer of the present invention is not particularly limited, the method of the present invention is suitable for the preparation of the polyester polymer.

That is, the method of the present invention comprises allowing a dihydric phenol (III) represented by the following general formula (III)

wherein X is as defined above,
or the dihydric phenol (III) and a dihydric phenol (IV) represented by the following general formula (IV)

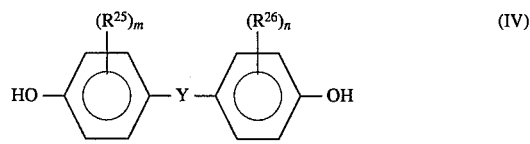

wherein $R^{25}$, $R^{26}$, m, n and Y are as defined above,
to react with a carbonate precursor or a dibasic acid.

The dihydric phenol represented by the general formula (III) (hereinafter, it will sometimes be referred to as dihydric phenol hydrazone compound) may be synthesized by allowing an aldehyde derivative to react with a hydrazine derivative according to known methods, as described in the following (A) and (B).

(A) SYNTHESIS OF THE DIHYDRIC PHENOL HYDRAZONE COMPOUND (III-A) WHEREIN X IS REPRESENTED BY THE FOLLOWING FORMULA (X-A)

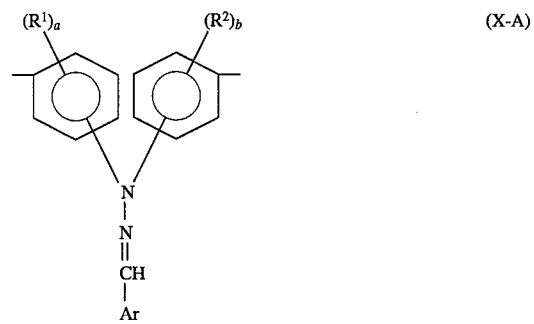

As shown in the following formula, the dihydric phenol hydrazone compound (III-A) may be synthesized by using a corresponding aldehyde derivative and a corresponding hydrazine derivative having two phenolic hydroxyl groups, as raw materials.

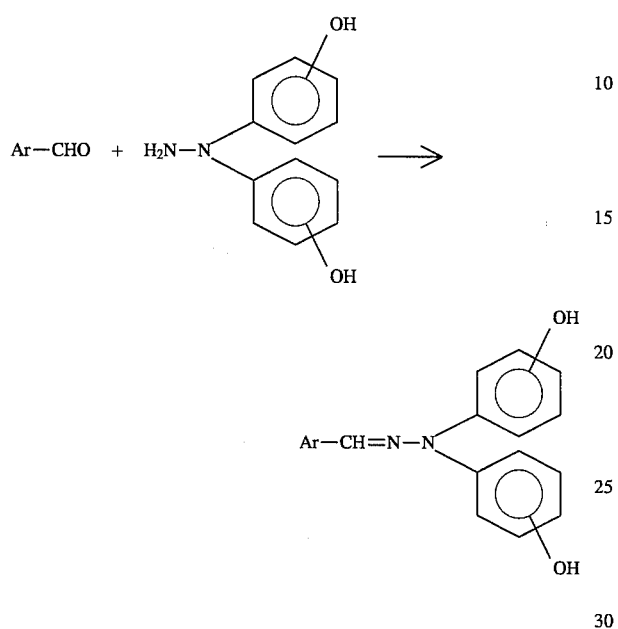

(B) Synthesis of the Dihydric Phenol Hydrazone Compound (III-B) Wherein X is One Other than those Represented by the Formula (X-A)

The dihydric phenol hydrazone compound (III-B) may be synthesized by using a corresponding aldehyde derivative having two phenolic hydroxyl groups and a corresponding hydrazine derivative.

The aldehyde derivative having two phenolic hydroxyl groups may be synthesized by applying known methods, such as a method of allowing a phenol derivative to react with chloroform in an alkali solution (Reimer-Tiemann reaction), a method of allowing hydrocyanic anhydride and dry hydrogen chloride to react with a phenol derivative or a phenol ether derivative, and then hydrolyzing, (Gattermann-Koch reaction), decomposition of an arylsulfonohydrazone, a method of oxidizing and hydrolyzing an arylsulfonyl ester, a method of allowing a phenol derivative to react with formamide in the presence of phosphorus oxychloride, and then hydrolyzing (Vilsmeier reaction), a method of allowing a phenol derivative to react with diphenylformamidine, and then hydrolyzing, hydrolysis, reduction of a carboxylic acid derivative, or oxidation of an alcohol derivative.

Some typical examples of the dihydric phenol hydrazone compound (III-A) which may be used in the present invention include the followings.

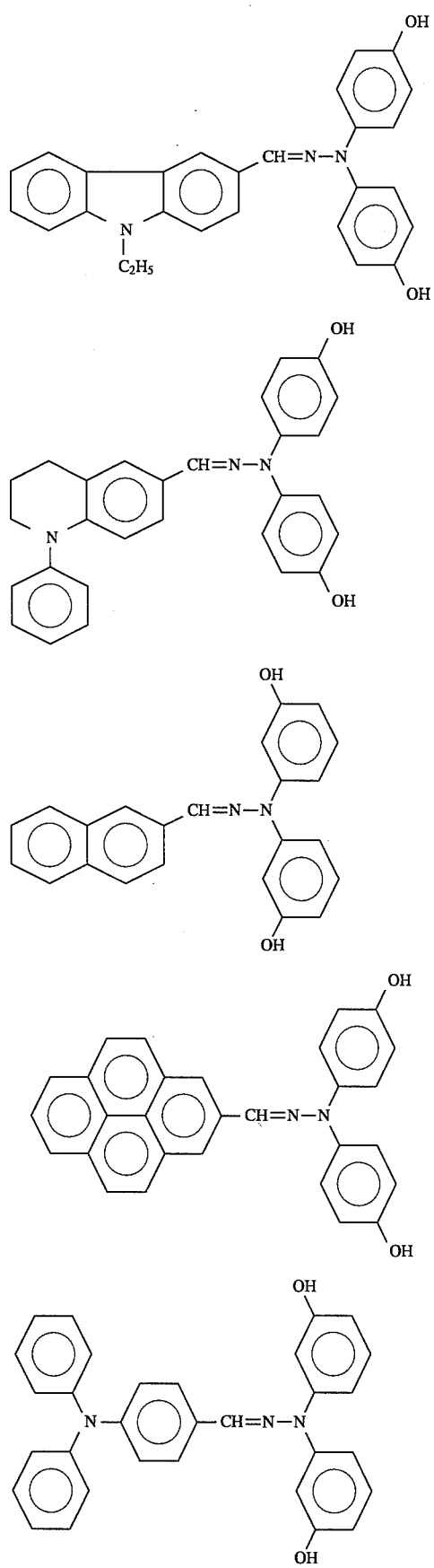

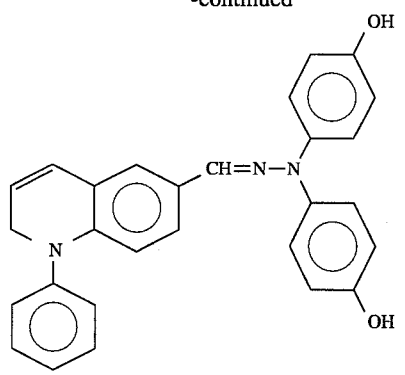
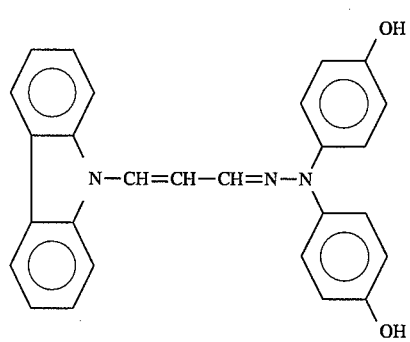
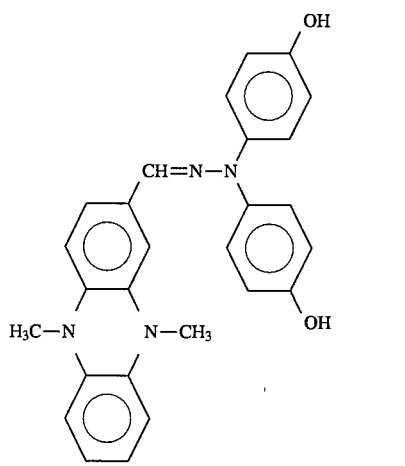
Some typical examples of the dihydric phenol hydrazone compound (III-B) include the followings, and the preferred are those encircled with square frames.
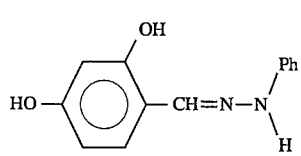 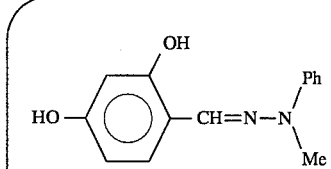 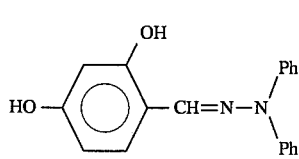
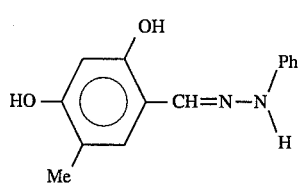 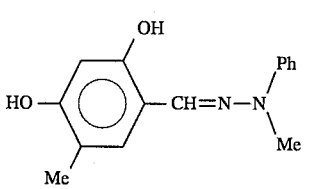 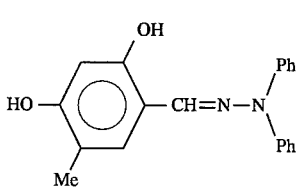

-continued
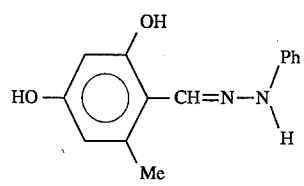 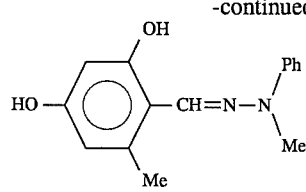 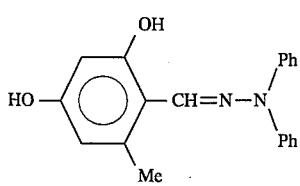
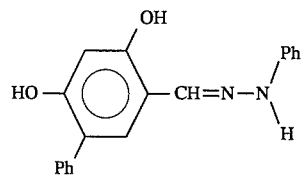 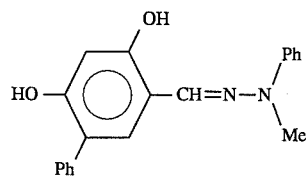 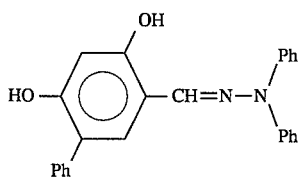
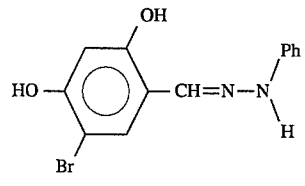 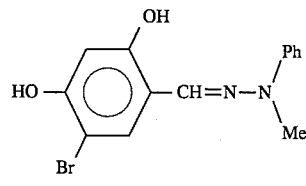 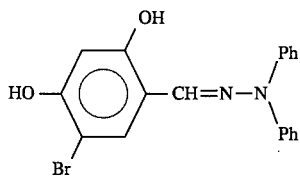
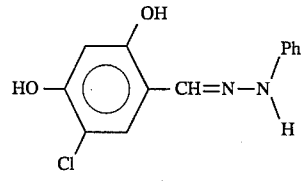 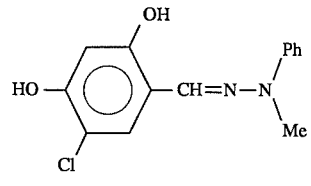 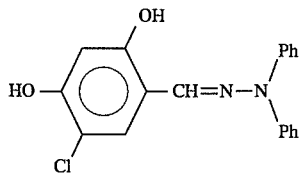
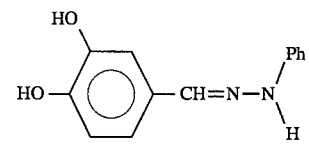 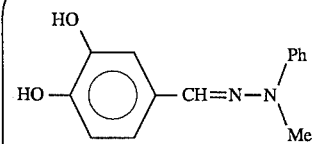 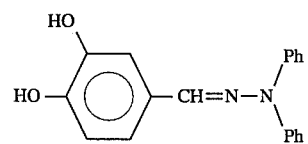
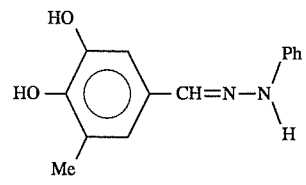 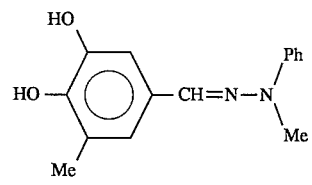 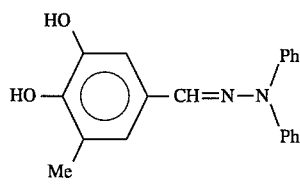
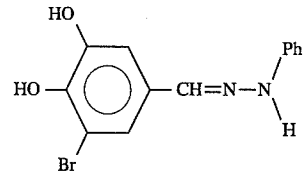 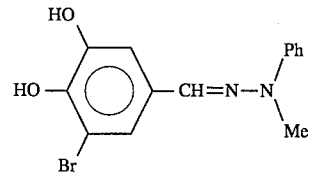 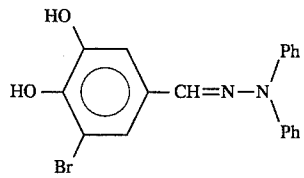
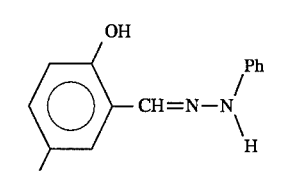 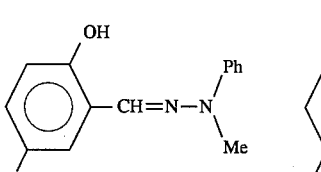 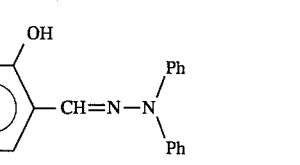

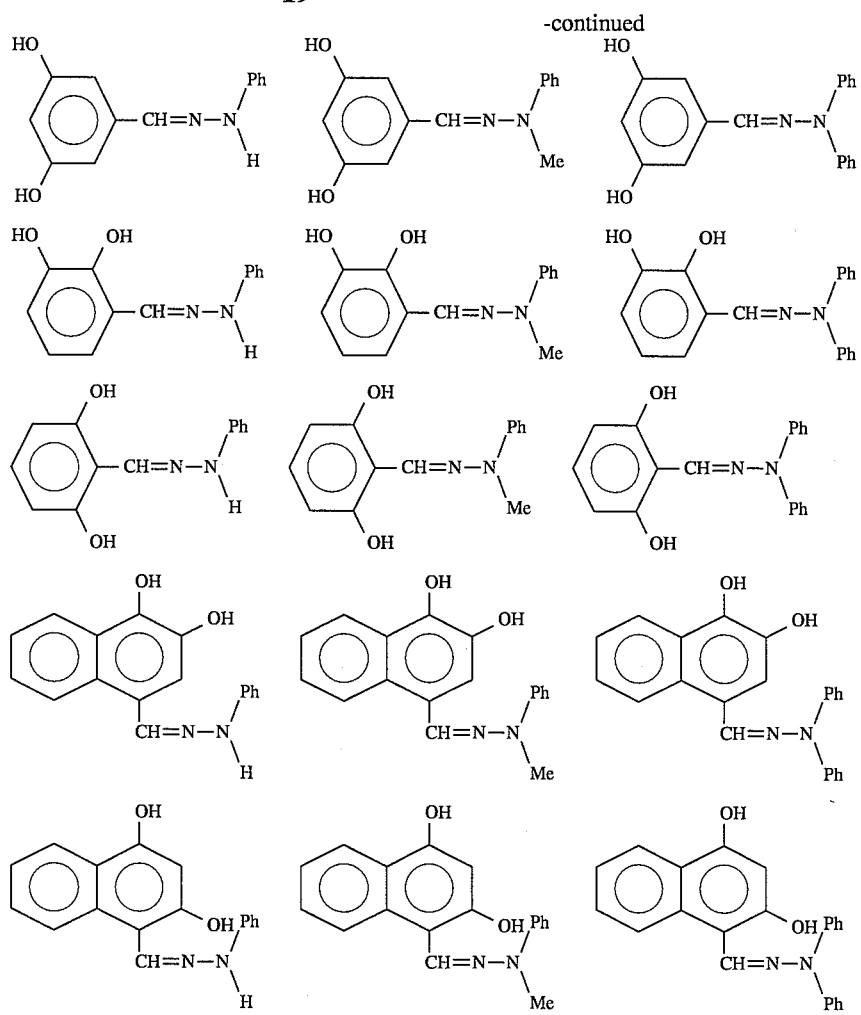
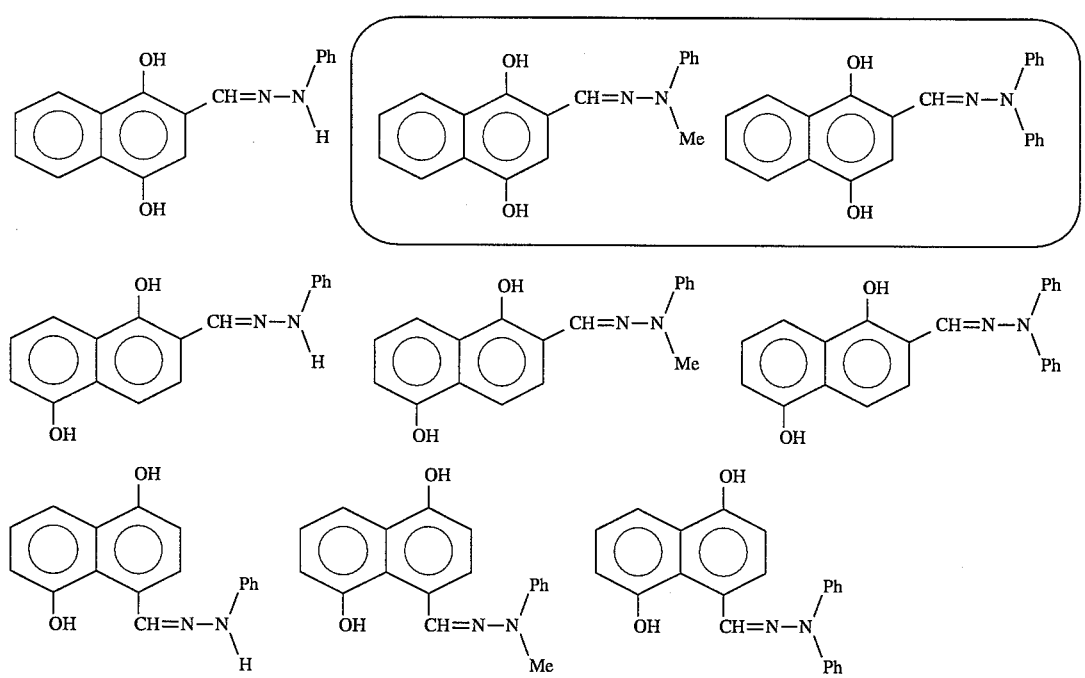

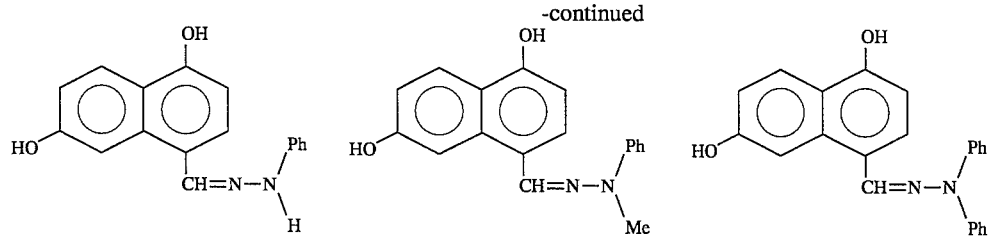
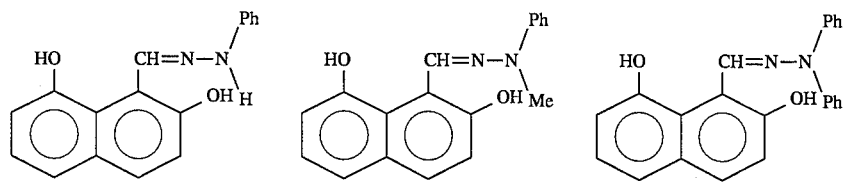
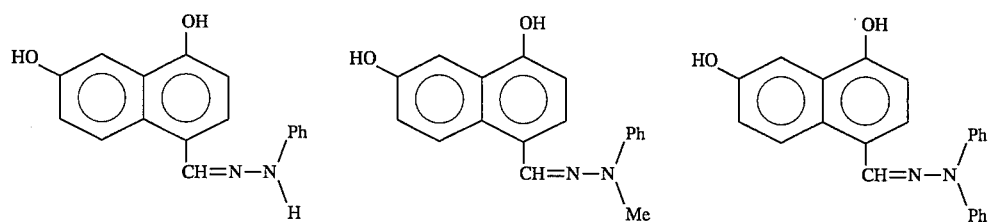
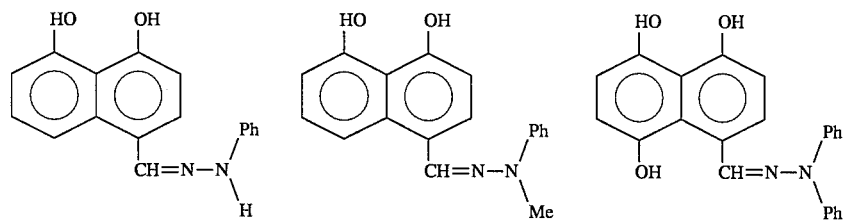
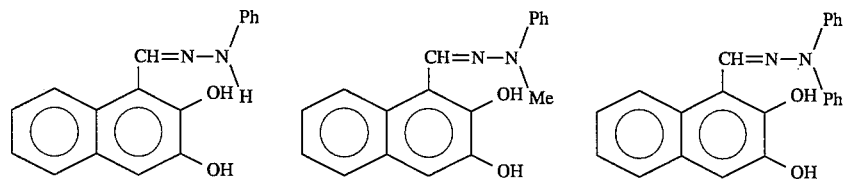
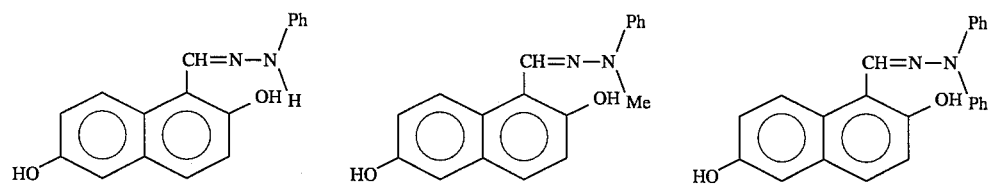
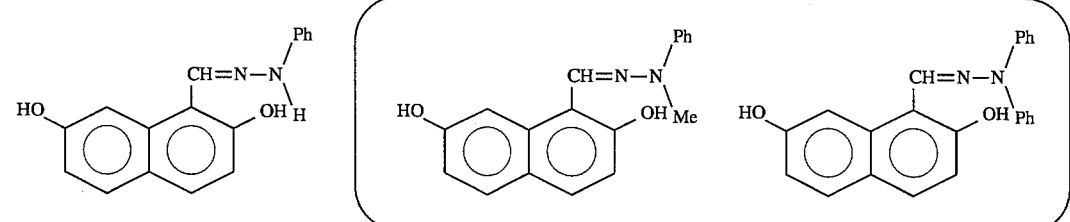
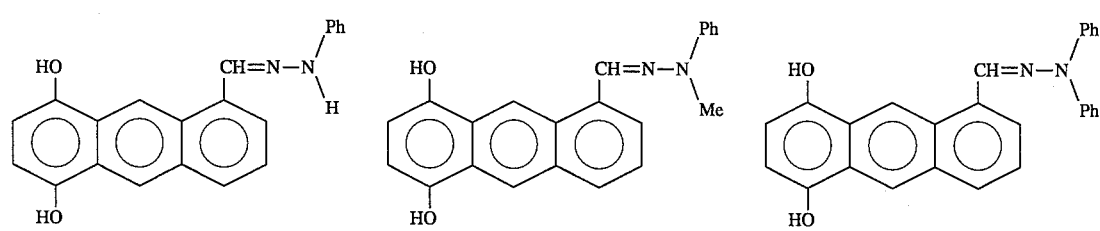

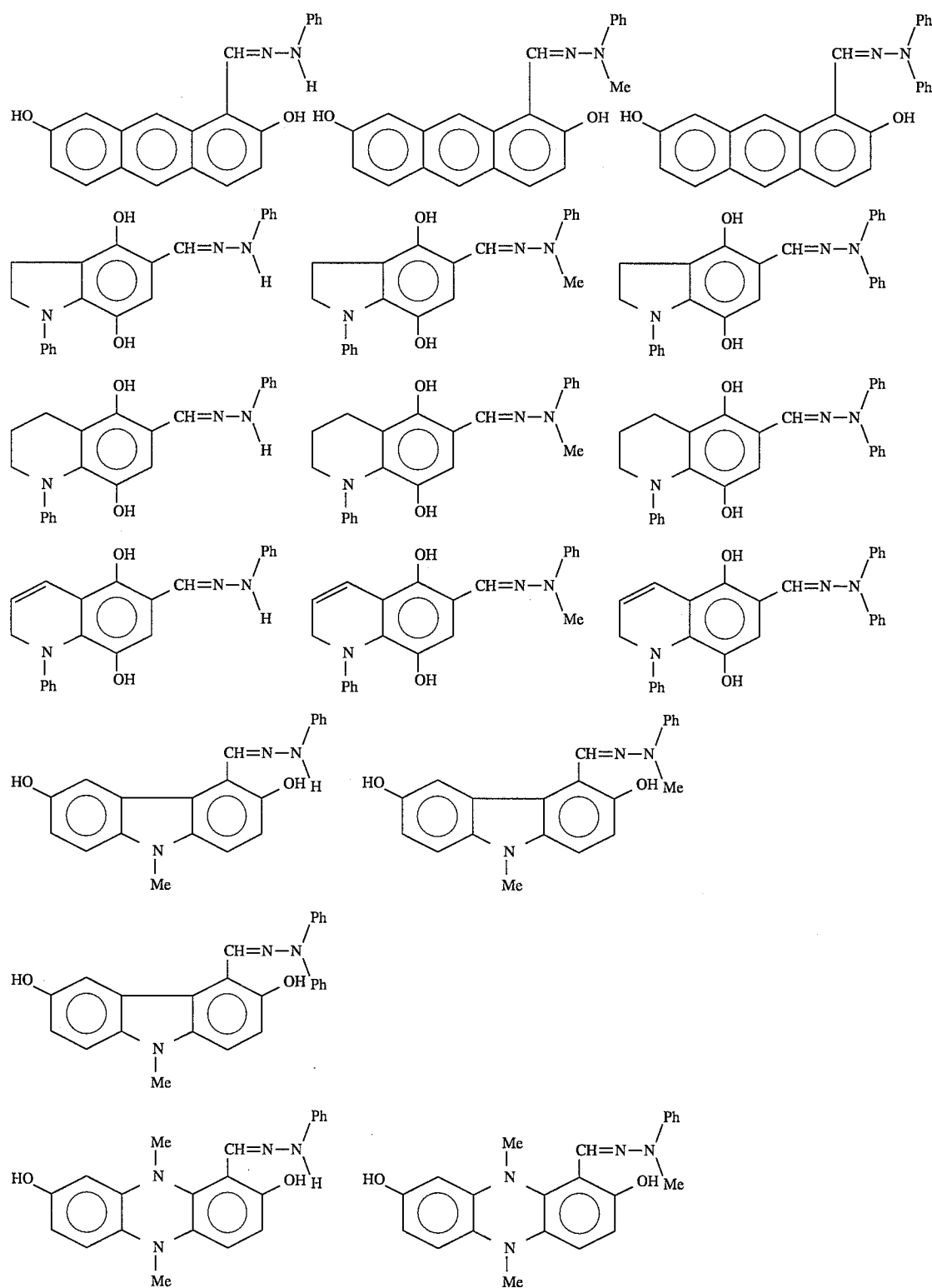

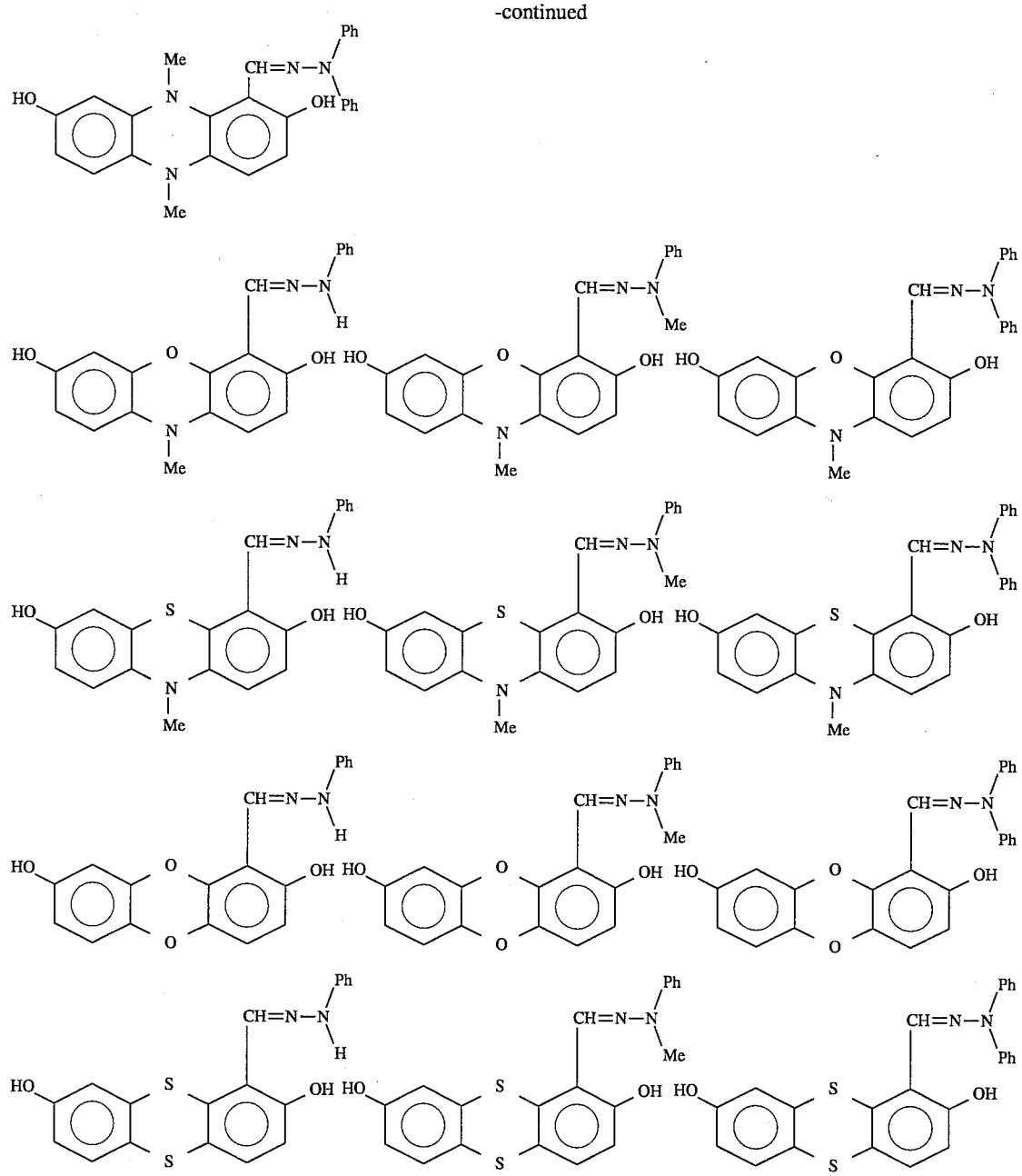

These dihydric phenol hydrazone compounds (III) may be used individually or in a combination of two or more.

Some examples of the dihydric phenol (IV) represented by the general formula (IV) include bis(4-hydroxyphenyl)methane, 1,1-bis(4-hydroxyphenyl)ethane, 1,2-bis(4-hydroxyphenyl)ethane, 2,2-bis(4-hydroxyphenyl)propane, 2,2-bis(3-methyl-4-hydroxyphenyl)butane, 2,2-bis(4-hydroxyphenyl)butane, 2,2-bis(4-hydroxyphenyl)octane, 4,4-bis(4-hydroxyphenyl)heptane, 4,4'-dihydroxytetraphenylmethane, 1,1-bis(4-hydroxyphenyl)-1-phenylethane, 1,1-bis(4-hydroxyphenyl)-1-phenylmethane, bis(4-hydroxyphenyl) ether, bis(4-hydroxyphenyl) sulfide, bis(4-hydroxyphenyl) sulfone, 1,1-bis(4-hydroxyphenyl)cyclopentane, 1,1-bis(4-hydroxyphenyl)cyclohexane, 2,2-bis(3-methyl-4-hydroxyphenyl)propane, 2-(3-methyl-4-hydroxyphenyl)-2-(4-hydroxyphenyl)-1-phenylethane, bis(3-methyl-4-hydroxyphenyl) sulfide, bis(3-methyl-4-hydroxyphenyl) sulfone, bis(3-methyl-4-hydroxyphenyl)methane, 1,1-bis(3-methyl-4-hydroxyphenyl)cyclohexane, 2,2-bis(2-methyl-4-hydroxyphenyl)propane, 1,1-bis(2-butyl-4-hydroxy-5-methylphenyl)butane, 1,1-bis(2-tert-butyl-4-hydroxy-3-methylphenyl)ethane, 1,1-bis(2-tert-butyl-4-hydroxy-5-methylphenyl)propane, 1,1-bis(2-tert-butyl-4-hydroxy-5-methylphenyl)butane, 1,1-bis(2-tert-butyl-4-hydroxy-5-methylphenyl)isobutane, 1,1-bis(2-tert-butyl-4-hydroxy-5-methylphenyl)heptane, 1,1-bis(2-tert-butyl-4-hydroxy-5-methylphenyl)-1-phenylmethane, 1,1-bis(2-tert-amyl-4-hydroxy-5-methylphenyl)butane, bis(3-chloro-4-hydroxyphenyl)methane, bis(3,5-dibromo-4-hydroxyphenyl)methane, 2,2-bis(3-chloro-4-hydroxyphenyl)propane, 2,2-bis(3-fluoro-4-hydroxyphenyl)propane, 2,2-bis(3-bromo-4-hydroxyphenyl)propane, 2,2-bis(3,5-difluoro-4- hydroxyphenyl)propane, 2,2-bis(3,5-dichloro-4-hydroxyphenyl)propane, 2,2-bis(3,5-dibromo-4-hydroxyphenyl)propane, 2,2-bis(3-bromo-4-hydroxy-5-chlorophenyl)propane, 2,2-bis(3,5-dichloro-4-hydroxyphenyl)butane, 2,2-bis(3,5-dibromo-4-hydroxyphenyl)butane, 1-phenyl-1,1-bis(3-fluoro-4-hydroxyphenyl)ethane, bis(3-fluoro-4-hydroxyphenyl) ether, 1,1-bis(3-cyclohexyl-4-hydroxyphenyl)cyclohexane, 4,4'-dihydroxybiphenyl, 4,4'-dihydroxy-3,3'-dimethylbiphenyl, 4,4'-dihydroxy-2,2'-dimethylbiphenyl, 4,4'-dihydroxy-3,3'-dicyclohexylbiphenyl, 3,3'-difluoro-4,4'-dihydroxybiphenyl, 2,2-bis(4-hydroxyphenyl)hexafluoropropane, 2,2-bis(3-phenyl-4-hydroxyphenyl)propane, 1,1-bis(3-phenyl-4-hydroxyphenyl)cyclohexane, bis(3-phenyl-4-hydroxyphenyl) sulfone and 4,4'-dihydroxybenzophenone. These dihydroxyaryl compounds may be used individually or in a combination of two or more.

Particularly preferred examples are 2,2-bis(4-hydroxyphenyl)propane, 4,4'-dihydroxytetraphenylmethane, 1,1-bis(4-hydroxyphenyl)cyclohexane and 1,1-bis(3-methyl-4-hydroxyphenyl)cyclohexane.

The types of the polyester polymers of the present invention are classified into three, namely polycarbonate, polyesters and polyestercarbonate, and hereinafter are disclosed the reaction processes for preparing these polymers according to the method of the present invention.

Reaction for Preparing Polycarbonate

A polycarbonate is prepared by performing a polycondensation using a carbonyl dichloride, such as phosgene, a haloformate, such as a chloroformate compound, or a carbonate compound as the carbonate precursor in the presence of a proper acid acceptor, or by performing a transesterification using a bisaryl carbonate as the carbonate precursor.

The polycondensation, which is carried out by using as the carbonate precursor a carbonyl dihalide, haloformate or carbonate compound in the presence of an acid acceptor, is generally carried out in a solvent.

The ratio of the carbonate precursor used may be selected properly in consideration of the stoichiometric ratios (equivalents) for the reaction. When a gaseous carbonate precursor, such as phosgene, is used, it is preferable to bubble it in the reaction mass.

Some examples of the acid acceptor include alkali metal hydroxides, such as sodium hydroxide and potassium hydroxide, alkali metal carbonates, such as sodium carbonate and potassium carbonate, organic bases, such as pyridine, and mixtures thereof.

The ratio of the acid acceptor used may also be selected properly in consideration of the stoichiometric ratios (equivalents) for the reaction. It is preferable to use two equivalents or slightly more of an acid acceptor per mole (one mole generally corresponds to two equivalents) of total of the dihydric phenols (III) and (IV) used.

As the solvent, various solvents, including those commonly used for the preparation of known polycarbonates, may be used individually or as a solvent mixture. Typical examples include hydrocarbon solvents, such as xylene, and halogenized hydrocarbon solvents, such as methylene chloride and chlorobenzene. An interfacial polymerization may be carried out by using two solvents which are not compatible with each other.

It is desirable to accelerate the polycondensation by adding a catalyst, for example, a tertiary amine, such as triethylamine, or a quarternary ammonium salt, or control the polymerization degree by adding an agent for controlling molecular weight (end terminator), such as p-tert-butylphenol or a phenylphenol. If desired, a small amount of an antioxidant, such as sodium sulfite or hydrosulfide, may also be added. The reaction is carried out generally at a temperature of 0° to 150° C., preferably 5° to 40° C. The reaction may be carried out under reduced pressure, at atmospheric pressure or under increased pressure, and, generally proceeds easily at atmospheric pressure or in a sealed reaction system. The reaction time depends on other reaction conditions, such as reaction temperature, and is generally 0.5 minutes to 10 hours, preferably about one minute to two hours.

A two-stage method also may be employed, wherein first a part of the reaction material comprising the dihydroxy compounds (III) and (IV) is allowed to react with the carbonate precursor to form an oligomer, and the remaining reaction material is added to complete the polycondensation. According to the two-stage method, the reaction can be easily controlled to adjust the molecular weight very accurately.

Some examples of the reaction system suitable for the latter transesterification between the dihydroxy compounds (III) and (IV) and the bisaryl carbonate include a fusion cook polycondensation and solid-phase polycondensation. In the fusion cook polycondensation, the two or three kinds of monomers are mixed with each other, and are then allowed to react under reduced pressure at a high temperature in a molten state. The reaction is carried out generally at 150° to 350° C., preferably 200° to 300° C. In the solid-phase polycondensation, the two or three kinds of monomers are mixed with each other, and polycondensation is then carried out by heating the reaction mass to a temperature not hither than the melting point of the objective polycarbonate. In either case, the reaction pressure is reduced preferably to 1 mmHg or lower at the last stage of the reaction, to distill away the phenol that is derived from the bisaryl carbonate by the transesterification from the reaction mass. The reaction time depends on other reaction conditions, such as the reaction temperature and the reaction pressure, and is generally about one to four hours. The reaction is preferably carried out in the atmosphere of an inert gas, such as nitrogen or argon, and, if desired, in the presence of other additives, such as the above-described agent for controlling molecular weight or an antioxidant.

The reduced viscosity ($\eta_{sp}/c$) of the resulting polycarbonate can be adjusted to the above-described range by various means, for example, by selecting the above-described reaction conditions, by controlling the amount of the end terminator or the branching agent used. According to circumstances, the obtained polycarbonate may be subjected to mechanical treatments, such as mixing or fractionation, and/or chemical treatments, such as polymer reactions, crosslinking or partial decomposition, to obtain a polycarbonate having a predetermined reduced viscosity ($\eta_{sp}/c$).

Some examples of the end terminator include phenol, α-naphthol, β-naphthol, o-methylphenol, m-methylphenol, p-methylphenol, p-ethylphenol, p-propylphenol, p-butylphenol, p-(t-butyl)phenol, p-phenylphenol, o-chlorophenol, m-chlorophenol, p-chlorophenol, o-bromophenol, m-bromophenol, p-bromophenol, o-methoxyphenol, m-methoxyphenol, p-methoxyphenol, p-ethoxyphenol, o-aminophenol, m-aminophenol, p-aminophenol, p-cyanophenol, p-nitrophenol, p-(perfluorononyl)phenol, p-(perfluorohexyloxy)phenol, p-(perfluorobutyl)phenol, 4-perfluorodecyl- 2,3,5,6-tetrafluorophenol, 3-methyl-4-(perfluorononyl)phenol, p-(2-1H,1H-perfluorotridecyloxy- 1,1,1,3,3,3-hexafluoro-2-propyl)phenol, 3,5-bis(perfluorohexyloxycarbonyl)phenol, p-1H,1H-perfluorooctyloxyphenol, perfluorodecyl p-hydroxybenzoate, (p-hydroxybenzyl)perfluorodecane and 2H,2H,9H-perfluorononane.

Some examples of the branching agent include polyhydroxy compounds, such as phloroglucinol, 2,6-dimethyl-2,4,6-tris(4-hydroxyphenyl)-3-heptene, 4,6-dimethyl-2,4,6-tris(4-hydroxyphenyl)-2-heptene, 1,3,5-tris(2-hydroxyphenyl)benzene, 1,1,1-tris(4-hydroxyphenyl)ethane, 2,6-bis(2-hydroxy-5-methylbenzyl)-4-methylphenol and α,α',α''-tris(4-hydroxyphenyl)-1,3,5-triisopropylbenzene, 3,3-bis(4-hydroxyaryl)oxyindole (=isatinbisphenol), 5-chloroisatin, 5,7-dichloroisatin and 5-bromoisatin.

The obtained reaction product (crude product) may be subjected to various after-treatments, including known separation or purification methods, to obtain a polycarbonate of a desired purity.

When a dihydroxy compound (III) or (IV) having an asymmetric molecule structure is used, the orientation of the resulting polycarbonate may be uniaxial or random depending on the polymerization method employed. The polycarbonate of the present invention may be of either orientation.

The preferred examples of thus obtained polycarbonate of the present invention include the followings.

a polycarbonate comprising two kinds of repeating units of the formulas:

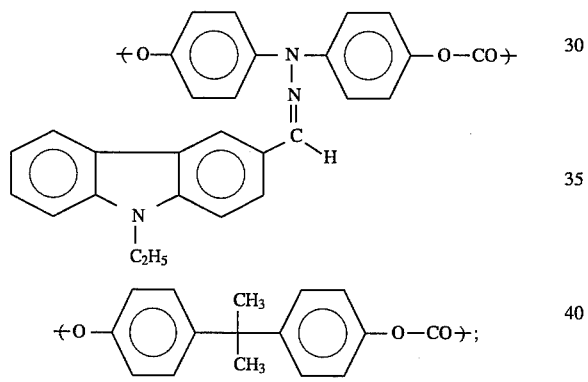

a polycarbonate comprising two kinds of repeating units of the formulas:

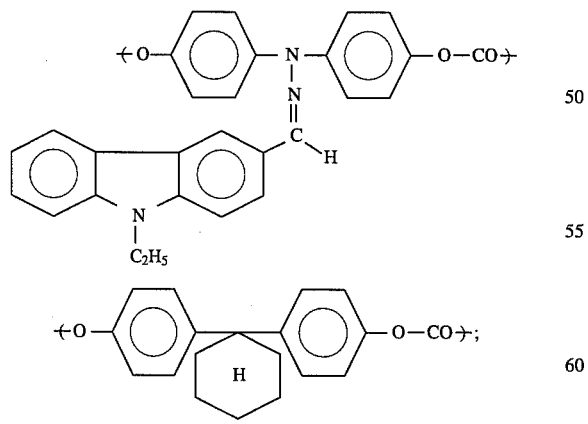

a polycarbonate comprising two kinds of repeating units of the formulas:

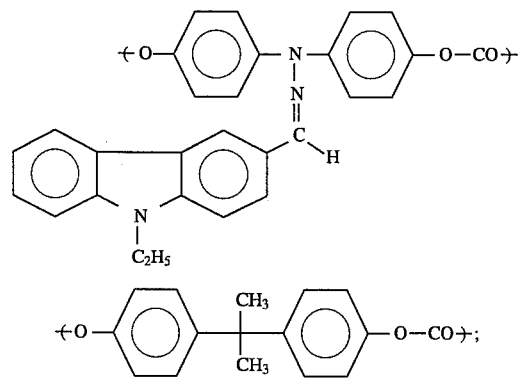

a polycarbonate comprising repeating units of the formula:

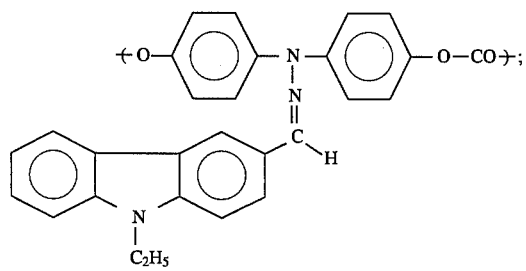

a polycarbonate comprising two kinds of repeating units of the formulas:

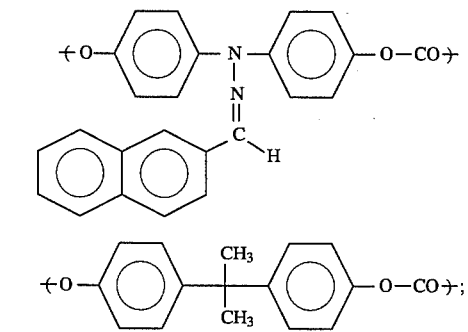

a polycarbonate comprising repeating units of the formula:

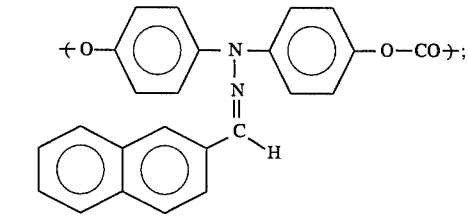

a polycarbonate comprising two kinds of repeating units of the formulas:

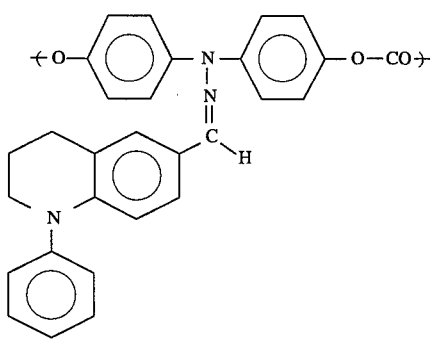

a polycarbonate comprising repeating units of the formula:

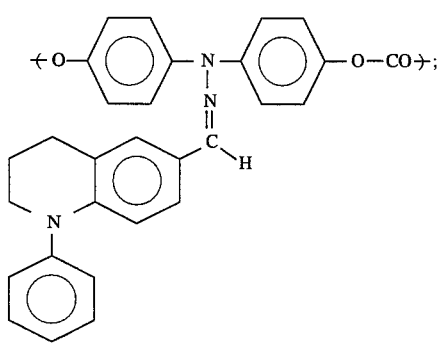

a polycarbonate comprising two kinds of repeating units of the formulas:

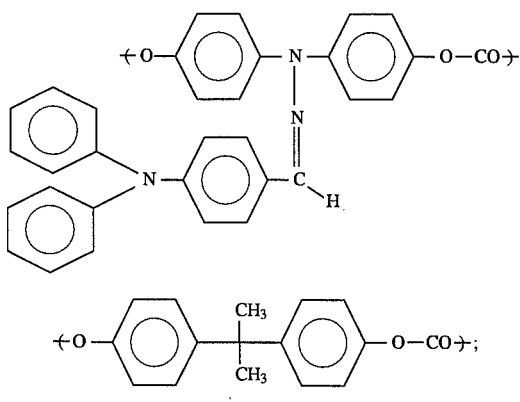

a polycarbonate comprising repeating units of the formula:

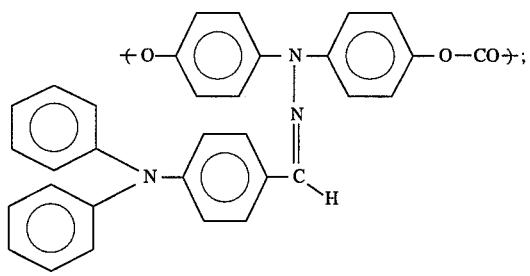

a polycarbonate comprising two kinds of repeating units of the formulas:

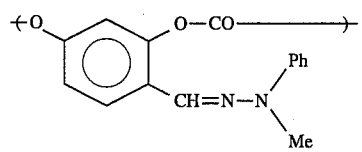

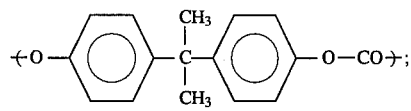

a polycarbonate comprising two kinds of repeating units of the formulas:

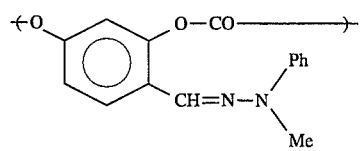

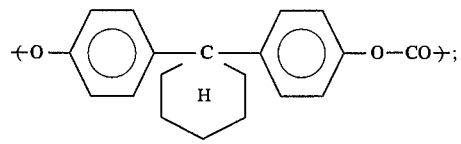

a polycarbonate comprising two kinds of repeating units of the formulas:

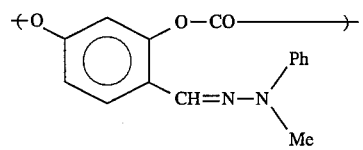

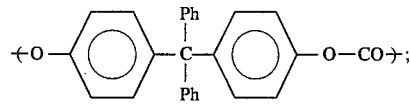

a polycarbonate comprising two kinds of repeating units of the formulas:

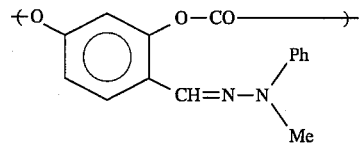

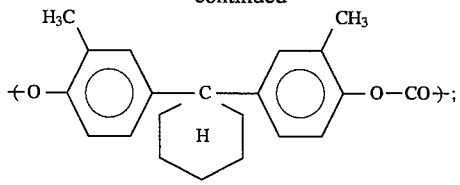

a polycarbonate comprising two kinds of repeating units of the formulas:

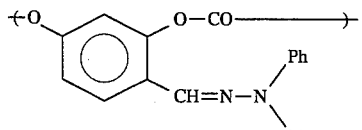

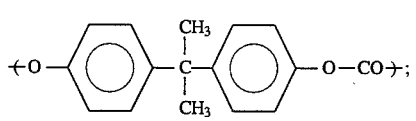

a polycarbonate comprising two kinds of repeating units of the formulas:

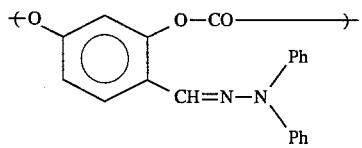

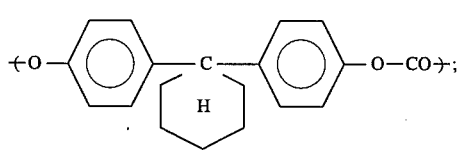

a polycarbonate comprising two kinds of repeating units of the formulas:

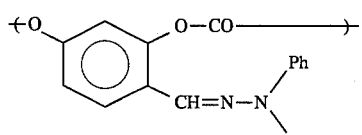

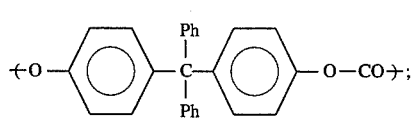

a polycarbonate comprising two kinds of repeating units of the formulas:

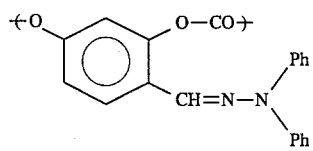

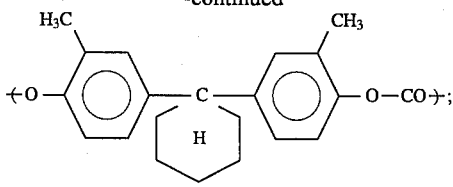

a polycarbonate comprising two kinds of repeating units of the formulas:

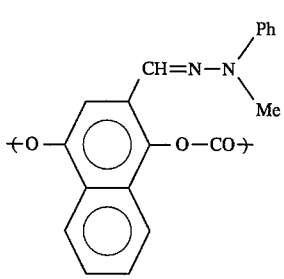

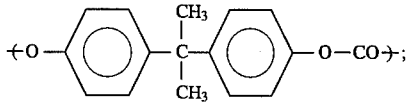

a polycarbonate comprising two kinds of repeating units of the formulas:

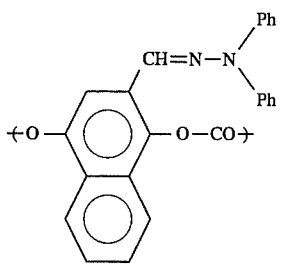

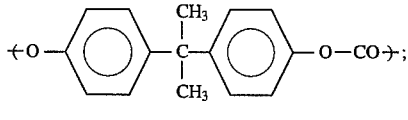

a polycarbonate comprising repeating units of the formula:

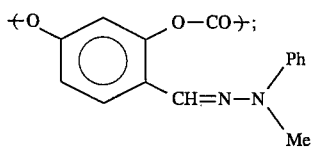

and a polycarbonate comprising repeating units of the formula:

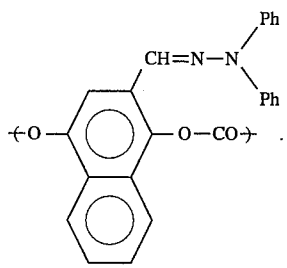

Reaction for Preparing Polyester

The polyester is prepared by allowing the dihydric phenol (III), or the dihydric phenol (III) and the dihydric phenol (IV), to react with a dibasic acid.

Some examples of the dibasic acid which may be used include isophthalic acid and terephthalic acid, and it is also possible to use reactive derivatives of dibasic acids, for example, diphenyl isophthalate, isophthaloyl halides, such as isophthaloyl dichloride, diphenyl terephthalate, and terephthaloyl halides, such as terephthaloyl dichloride.

The reaction may be carried out by any one of a fusion cook polymerization, a solution polymerization and an interfacial polymerization.

According to a fusion cook polymerization, a polyester is prepared by melting acetates of the above-described dihydric phenols and the dibasic acid, and then allowing them to react generally for 1 to 10 hours at 120° to 300° C. under reduced pressure.

According to a solution polymerization, a polyester is prepared by allowing the dihydric phenols to react with the dibasic acid in an organic solvent, in the presence of a dehydrohalogenating agent, for 1 to 10 hours at 5° to 100° C. Some examples of the organic solvent which may be used include benzene, toluene, chloroform, 1,2-dichloroethane and chlorobenzene. Some examples of the dehydrohalogenating agent which may be used include amines, such as triethylamine. This method does not necessarily require catalysts, but is generally carried out by using a catalyst, such as a tertiary ammonium salt or a sulfonium salt.

According to a interfacial polymerization, a polyester is prepared by dissolving the dihydric phenols in an aqueous alkali solution and dissolving the dibasic acid in a solvent which is not compatible with water, and then carrying out a reaction by mixing and stirring a mixture of the two solutions. The reaction temperature generally ranges from 2° C. to the boiling point of the organic solvent used, preferably from 5° to 50° C., and the reaction time is generally one minute to 24 hours, preferably 0.1 to 2 hours. Some examples of the aqueous alkali solution which may be used include an aqueous potassium hydroxide solution, an aqueous sodium hydroxide solution and an aqueous lithium hydroxide solution, which have a concentration enough to dissolve the dihydric phenols completely. Some examples of the solvent that is not compatible with water include methylene chloride, carbon tetrachloride and chloroform. In order to accelerate polycondensation, the reaction is preferably carried out in the presence of a catalyst, for example, a tertiary amine, such as triethylamine, or a trimethylbenzylammonium chloride. The preferred amount of the catalyst is 0.1 to 100 millimoles per mole of polymer. The concentration of the dibasic acid in the organic solvent is generally 1 to 40 W/V%, preferably 5 to 30 W/V%, and the concentration of the dihydric phenols in the aqueous alkali solution is generally 1 to 30 W/V%, preferably 5 to 20 W/V%. It is desirable that the above-described agent for controlling molecular weight, such as an end terminator or a branching agent, be added to control the polymerization degree.

Reaction for Preparing Polyestercarbonate

A polyestercarbonate is prepared by mixing the above-described dihydric phenols, carbonate precursor and dibasic acid, in predetermined ratios, at the same time or in steps, and performing one-stage or a multi-stage polymerization, in the optional presence of an acid acceptor, a catalyst, an agent for controlling molecular weight, such as an end terminator or a branching agent, and a solvent.

A particularly preferred is a two-stage polymerization wherein a part of the dihydric phenols is allowed to react with the carbonate precursor to form a polycarbonate oligomer, which is then mixed with a reaction mass containing the remaining dihydric phenols and the dibasic acid, to carry out polycondensation. Although the carbonate precursor, the solvent, the catalyst, the acid acceptor and the reaction conditions that are employed for the preparation of the polycarbonate oligomer are similar to those described with respect to the preparation of the polycarbonate, a suitable reaction temperature is generally 0° to 50° C., preferably 10° to 30° C., and a suitable reaction time is generally 10 to 60 minutes, preferably 15 to 30 minutes.

The ratio of remaining dihydric phenols, which were not used for the synthesis of the polycarbonate oligomer, to the dibasic acid may be selected in consideration of the stoichiometric ratios of the polycondensation, and it is generally desirable to use about one mole of the dibasic acid per mole of the remaining dihydric phenols. The reaction mass containing the remaining dihydric phenols and the dibasic acid is generally prepared by dissolving the remaining dihydric phenols in the aqueous solution of an alkali metal hydroxide or alkali metal carbonate as described above, which is then mixed with the dibasic acid dissolved in the above-described organic solvent which is not compatible with water, with stirring. In the reaction mass, the condensation between the remaining dihydric phenols and the dibasic acid is proceeding to form a polyester oligomer.

Thereafter, to the reaction mass, wherein the polyester oligomer is being formed, is added the above-described polycarbonate oligomer, preferably a solution, for example, a methylene chloride solution, of the polycarbonate oligomer, to carry out polycondensation. The temperature of the polycondensation is generally 0° to 50 ° C., preferably about 5° to 20° C. A sufficient reaction time is generally five minutes to three hours, preferably about 10 minutes to 1.5 hours. The reaction pressure is not particularly limited, and atmospheric pressure or a somewhat reduced pressure is suitable. According to demand, the polycondensation may be carried out in the presence of appropriate, additional components, such as an agent for controlling molecular weight, a catalyst or a solvent, which is added at a proper point of time. Thus a polyestercarbonate is obtained.

The present invention further provides an electrophotographic photoreceptor which comprises an electroconductive substrate and a photosensitive layer disposed on a surface of the electroconductive substrate and is characterized in that the photosensitive layer contains the polyester polymer of the present invention as a charge transporting material (as both a charge transporting material and a binder resin) or as a binder resin.

The electrophotographic photoreceptor of the present invention may be of any structure, including those of known various electrophotographic photoreceptors, so far as the polyester polymer of the present invention is used as both a charge transporting material and a binder resin, or as a binder resin, in the photosensitive layer. A preferred example is a layered-type electrophotographic photoreceptor the photosensitive layer of which contains at east one charge generation layer and at least one charge transport layer containing the polyester polymer as both a charge transporting material and a binder resin, or as a binder resin.

In the photosensitive layer of the electrophotographic photoreceptor of the present invention, the charge transport layer may be disposed on the charge generation layer, or the charge generation layer may be disposed on the charge transport layer. According to demand, a electroconductive or insulating layer also may be formed as a surface protecting layer. Further, intermediate layers, such as an adhesive layer for improving the adhesion of layers or a blocking layer for blocking charge, also may be provided.

In the electrophotographic photoreceptor of the present invention, the polyester polymer of the present invention may be used individually or in a combination of two or more. Although the polyester polymer of the present invention itself functions not only as a charge transporting material but also as a binder resin, other charge transporting materials or other binder resins, such as other polycarbonates, may be added according to demand, so far as the object of the present invention is attained.

By using a polyester polymer of the present invention which contains more than 50 mol % of the repeating units (I), an electrophotographic photoreceptor having satisfactory electrophotographic properties can be produced without using conventional low molecular weight charge transporting materials. When a polyester polymer containing not more than 50 mol % of the repeating units (I) is used, it is preferable to add a conventional low molecular weight charge transporting material. However, in layered-type electrophotographic photoreceptors, it is desirable that the amount of the low molecular weight charge transporting material added be not more than 50% by weight of the charge transport layer, and in single-layer-type electrophotographic photoreceptors, it is also desirable that the amount be not more than 50% by weight of the photosensitive layer.

The electroconductive substrate to be used in the present invention may be of various materials, including known ones, and some examples include a plate, a drum or a sheet of metal, such as aluminum, brass, copper, nickel or steel, a plastic sheet rendered with electroconductivity by evaporating, spattering or applying thereon an electroconductive material, such as aluminum, nickel, chromium, palladium or graphite, a metal drum the surface of which is oxidized, for example, by electrode oxidation, and a plate of glass, plastic, cloth or paper, which is rendered with electroconductivity by the means as described above.

The charge generation layer of the layered-type electroconductive photoreceptor contains at least a charge generating material and is formed, for example, by vacuum-evaporating or spattering the charge generating material on the surface of a predetermined base layer, or by binding the charge generating material to the predetermined base layer with a binder resin. As to the method of forming the charge generation layer by using a binder resin, various methods including known ones may be employed, and, in general, it is preferable to coat a predetermined base layer with a coating liquid which is prepared by dispersing or dissolving a charge generating material in an appropriate solvent together with a binder resin and then drying the coating.

The charge generating material to be used in the present invention may be selected from various ones including known ones, and typical examples include various inorganic materials, for example, simple substances of selenium, such as non-crystalline selenium and crystalline selenium of a trigonal system, selenium-based alloy, such as selenium-tellurium alloys, selenides, such as $As_2Se_3$, selenium-containing compositions, zinc oxide, inorganic materials comprising elements of the Group II and elements of the Group IV in the periodic table, such as CdS-Se, oxide semiconductors, such as titanium oxide, and silicon-based materials, such as amorphous silicon, and various organic materials, for example, phthalocyanines, metal complexes of phthalocyanines, cyanin, anthracene, bisazo compounds, pyrene, perylene, pyrylium salts, thiapyrylium salts, polyvinyl carbazole and squarelium pigments.

These charge generating materials may be used individually or in a combination of two or more of them, for example, as a mixture.

The binder resin which may be used in the charge generation layer is not particularly limited, and various ones, including known ones, may be used. Typical examples include thermoplastic resins, such as polystyrene, polyvinyl chloride, polyvinyl acetate, vinyl chloride-vinyl acetate copolymers, polyvinyl acetal, alkyd resins, acrylic resins, polyacrylonitrile, polycarbonates, polyamides, polyketones, polyacrylamides, butyral resins and polyesters, and thermosetting resins, such as polyurethanes, epoxy resins and phenolic resins.

The charge transport layer may be formed by forming, on a predetermined base layer, a layer of the polyester polymer of the present invention, or a layer of a charge transporting material dispersed in the polyester polymer of the present invention.

As to the method of forming the charge transport layer, various methods including known ones may be employed, and, in general, it is preferable to coat a predetermined base layer with a coating liquid which is prepared by dispersing or dissolving the polyester polymer of the present invention alone or together with a conventional charge transporting material in an appropriate solvent, and drying the coating.

In the charge transport layer, the polyester polymer of the present invention may be used individually or in a form of a mixture of two or more. The charge transport layer formed by using the polyester polymer of the present invention as a charge transporting material can exhibit excellent electrophotographic properties even in the absence of other binder resins having no photoconductivity. It is also possible to use other binder resins in combination with the polyester polymer of the present invention so far as the object of the present invention is attained.

Examples of charge transporting materials other than the polyester polymer of the present invention, which may be used in the present invention, include electron transporting materials and hole transporting materials, which have been conventionally used.

Some examples of the electron transporting materials include electron withdrawing compounds, for example, chloranil, bromanil, 2,3-dichloro-5,6-dicyano-p-benzoquinone, tetracyanoethylene, tetracyanoquinodimethane, 2,4,7-trinitro-9-fluorenone, 2,4,5,7-tetranitro-9-fluorenone, 2,4,7-trinitro-9-dicyanomethylenefluorenone, 2,4,5,7-tetranitroxanthone, 2,4,9-trinitrothioxanthone, 3,5-dimethyl-3', 5'-di-tert-butyl-4,4'-diphenoquinone, and polymers prepared therefrom. These electron withdrawing compounds may be used individually or in a combination of two or more, for example in a form of a mixture thereof.

Some examples of the hole transporting materials include pyrene, N-ethylcarbazole, N-isopropylcarbazole, hydrazones, such as N-methyl-N-phenylhydrazino-3-methylidene- 9-ethylcarbazole, N,N-diphenylhydrazino-3-methylidene-9-ethylcarbazole, N,N-diphenylhydrazino-3-methylidene-10-ethylphenothiazine, N,N-diphenylhydrazino-3-methylidene-10-ethylphenoxazine, p-diethylaminobenzaldehyde-N,N-diphenylhydrazone, p-diethylaminobenzaldehyde-N-α-naphthyl-N-phenylhydrazone, p-pyrrolidinobenzaldehyde-N,N-diphenylhydrazone, 1,3,3-trimethylindolenine-ω-aldehyde-N,N-diphenylhydrazone, p-diethylbenzaldehyde-3-methylbenzothiazolinone-2-hydrazone and 1-phenyl-1,2,3,4-tetrahydroquinoline-6-carboxyaldehyde-1',1'-diphenylhydrazone, 2,5-bis(p-diethylaminophenyl)-1,3,4-oxadiazole, pyrazolines, such as 1-phenyl-3-(p-diethylaminostyryl)-5-(p-diethylaminophenyl)pyrazoline, 1-[quinolyl(2)]-3-(p-diethylaminostyryl)-5-(p-diethylaminophenyl)pyrazoline, 1-[lepidyl(2)]-3-(p-diethylaminostyryl)-5-(p-diethylaminophenyl)pyrazoline, 1-[6-methoxy-pyridyl(2)]-3-(p-diethylaminostyryl)-5-(p-diethylaminophenyl)pyrazoline, 1-[pyridyl(5)]-3-(p-diethylaminophenyl)pyrazoline, 1-[pyridyl(2)]-3-(p-diethylaminostyryl)-5-(p-diethylaminophenyl)pyrazoline, 1-[pyridyl(2)]-3-(p-diethylaminostyryl)-4-methyl-5-(p-diethylaminophenyl)pyrazoline, 1-[pyridyl(2)]-3-(α-methyl-p-diethylaminostyryl)-5-(p-diethylaminophenyl)pyrazoline, 1-phenyl-3-(p-diethylaminostyryl)-4-methyl-5-(p-diethylaminophenyl)pyrazoline, 1-phenyl-3-(α-benzyl-p-diethylaminostyryl)-5-(p-diethylaminophenyl)pyrazoline and spiropyrazoline, oxazole compounds, such as 2-(p-diethylaminostyryl)-δ-diethylaminobenzoxazole and 2-(p-diethylaminophenyl)-4-(p-dimethylaminophenyl)-5-(2-chlorophenyl)oxazole, thiazole compounds, such as 2-(p-diethylaminostyryl)-6-diethylaminobenzothiazole, triarylmethane compounds, such as bis(4-diethylamino-2-methylphenyl)-phenylmethane, polyarylamines, such as 1,1-bis(4-N,N-diethylamino-2-methylphenyl)heptane and 1,1,2,2-tetrakis(4-N,N-dimethylamino-2-methylphenyl)ethane, benzidine compounds, such as N,N'-diphenyl-N,N'-bis(m-ethylphenyl)benzidine, N,N'-diphenyl-N,N'-bis(ethylphenyl)benzidine, N,N'-diphenyl-N,N'-bis(propylphenyl)benzidine, N,N'-diphenyl-N,N'-bis(butylphenyl)benzidine, N,N'-diphenyl-N,N'-bis(isopropylphenyl)benzidine, N,N'-diphenyl-N,N'-bis(sec-butylphenyl)benzidine, N,N'-diphenyl-N,N'-bis(tert-butylphenyl)benzidine and N,N'-diphenyl-N,N'-bis(chlorophenyl)benzidine, butadiene compounds, triphenylamine, poly-N-vinylcarbazole, polyvinylpyrene, polyvinylanthracene, polyvinylacrydine, poly-9-vinylphenylanthracene, organic polysilanes, pyrene-formaldehyde resins and ethylcarbazole-formaldehyde resins.

These may be used individually or in a combination of two or more, for example in a form of a mixture thereof.

In the electrophotographic photoreceptor of the present invention, various additives, which have been used to improve the performances of electrophotographic photoreceptors, may be added in the charge generation layer and the charge transport layer.

The additives include sensitizers, other various chemical materials for preventing increase in residual electric potential, decrease in charged electric potential and decrease in sensitivity during repeated use, various plasticizers or surfactants for improving film quality, antioxidants, anti-curling agents and leveling agents.

Typical examples of the sensitizers include triphenylmethane dyes, such as Methyl Violet, Crystal Violet, Night Blue and Victoria Blue, acrydine dyes, such as erythrosine, Rhodamine B, Rhodamine 3R, Acrydine Orange and Furapeocin, thiazine dyes, such as Methylene Blue and Methylene Green, oxazine dyes, such as Capri Blue and Meldola's Blue, cyanin dyes, merocyanine dyes, styryl dyes, pyrylium salt dyes and thiopyrylium salt dyes.

The typical examples of the chemical materials that may be used separately from the sensitizers for the purposes of preventing increase in residual electric potential, decrease in charged electric potential and decrease in sensitivity during repeated use include electron attractive compounds, such as anthraquinone, 1-chloroanthraquinone, benzoquinone, 2,3-dichlorobenzoquinone, naphthoquinone, diphenoquinone, 4,4'-dinitrobenzophenone, 4,4'-dichlororobenzophenone, 4-nitrobenzophenone, 4-nitrobenzalmalononic dinitrile, ethyl α-cyano-β-(p-cyanophenyl)acrylate, 9-anthracenylmethylmalonic dinitrile, 1-cyano-1-(p-nitrophenyl)-2-(p-chlorophenyl)ethylene and 2,7-dinitrofluorenone.

The typical examples of the plasticizers include dimethyl phthalate, dibutyl phthalate, dioctyl phthalate, triphenyl phosphate, diisobutyl adipate, dimethyl sebacate, dibutyl sebacate, butyl laureate, methyl phthalyl glycolate and dimethyl glycol phthalate.

In order to improve surface lubricity, it is also possible to add tetrafluoroethylene resin, trifluorochloroethylene resin, tetrafluoroethylene hexafluoropropylene resin, vinyl fluoride resin, vinylidene fluoride resin, difluorodichloroethylene resin, copolymers thereof or fluorine graft copolymers.

These additives may be used individually or in a combination of two or more, for example, as a mixture.

Some examples of the solvent to be used to form the charge generation layer or the charge transport layer include aromatic solvents, such as benzene, toluene, xylene and chlorobenzene, ketones, such as acetone, methyl ethyl ketone and cyclohexanone, alcohols, such as methanol, ethanol and isopropanol, esters, such as ethyl acetate and ethyl cellosolve, halogenized hydrocarbons, such as carbon tetrachloride, chloroform, dichloromethane and tetrachloroethane, ethers, such as tetrahydrofuran and dioxane, dimethylformamide, dimethyl sulfoxide and diethylformamide.

These solvents may be used individually or in a combination of two or more, for example in a form of a solvent mixture thereof.

Coating of the above-described layers may be carried out by using various coating apparatuses including known ones, such as an applicator, a spray coater, a bar coater, a tip coater, a role coater, a dip coater and a doctor blade.

The photosensitive layer of the single-layer-type electrophotographic photoreceptor contains at least the polyester polymer of the present invention (or the polyester polymer and other charge transporting materials as described above) and the above-described charge generating material. As to the method of forming the photosensitive layer, various methods including known ones may be employed, and, in general, it is preferable to coat a predetermined base layer with a coating liquid which is prepared by dispersing or dissolving a charge generating material, or a charge generating material and a charge transporting material, in an appropriate solvent together with the polyester polymer of the present invention, and drying the coating.

Other binder resins also may be used together with the polyester polymer so far as the object of the present invention can be attained.

The present invention will be described in more detail with reference to the following Examples, which, however, are not to be construed to limit the scope of the invention.

EXAMPLE 1

A solution of 74 g of 2,2-bis(4-hydroxyphenyl)propane dissolved in 550 ml of a 6%-aqueous sodium hydroxide solution was mixed with 250 ml of methylene chloride. While the mixture was stirred and cooled, 950 ml/min of phosgene gas was bubbled therein for 15 minutes. The reaction liquid was allowed to stand to separate an inorganic phase, which was a methylene chloride solution of an oligomer of 2 to 4 polymerization degree having chloroformate groups at molecular ends. The obtained methylene chloride solution of the oligomer was diluted to 450 ml with methylene chloride, and was then mixed with a solution of 44.3 g of 9-ethylcarbazole-3-carbaldehyde- 1',1'-bis(4-hydroxyphenyl)hydrazone dissolved in 150 ml of a 8%-aqueous sodium hydroxide solution. To the mixture was added 3.0 g of p-tert-butylphenol as an agent for controlling molecular weight. While the solution mixture was stirred vigorously, 2 ml of a 7%-aqueous triethylamine solution as a catalyst was added thereto, and reaction was then carried out for 1.5 hours at 28° C., with stirring. After the completion of the reaction, the reaction product was diluted with one liter of methylene chloride and was then washed successively with two 1.5 liter portions of water, one liter of 0.01N hydrochloric acid and two one liter portions of water, and reprecipitation was carried out by pouring the organic phase in methanol. The obtained copolymer had a reduced viscosity $(\eta_{sp}/c)$ of 0.74 dl/g, measured at 20° C. as a solution of 0.5 g/dl concentration in methylene chloride.

The copolymer was analyzed by an $^1$H-NMR spectrum, to obtain the following result: 1.46 (0.53H, t, J=7Hz), 1.70 (6H, s), 4.39 (0.35H, q, J=7Hz), 7.1–7.55 (9.58H, m), 7.61 (0.70H, dm, J=9Hz), 7.89 (0.18H, dd, J=8.5, 1.5Hz), 8.09 (0.18H, dt, J=7.5, 1.5Hz), 8.22 (0.18H, dd, J=1.5, 0.5Hz) (ppm). An IR spectrum analysis showed absorption due to benzene rings at 3030 cm$^{-1}$, 1590 cm$^{-1}$ and 830 cm$^{-1}$, absorption due to carbonyl groups at 1650 cm$^{-1}$ and absorption due to ether bonds at 1240 cm$^{-1}$, thereby indicating the presence of carbonate bonds. According to the results of these analyses, the copolymer was confirmed to have the following structure and composition.

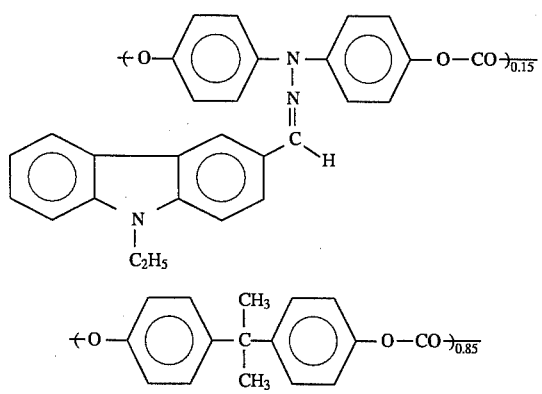

EXAMPLE 2

The procedure of Example 1 was repeated with the exception that 87 g of 1,1-bis(4-hydroxyphenyl)cyclohexane was used in place of 74 g of the 2,2-bis(4-hydroxyphenyl)propane used in Example 1, to obtain a copolymer $((\eta_{sp}/c)=0.68$ dl/g) having the following structure and composition. An IR spectrum of the copolymer showed the same absorption as that of the copolymer obtained in Example 1, whereby the copolymer was confirmed to have the following structure and composition.

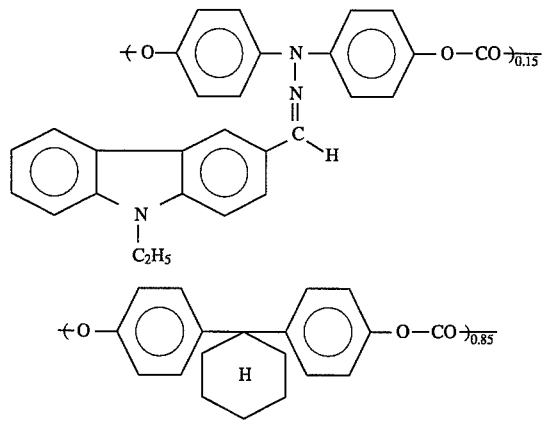

EXAMPLE 3

200 ml of methylene chloride and a solution of 52.6 g of 9-ethylcarbazole-3-carbaldehyde-1',1'-bis(4-hydroxyphenyl)hydrazone and 28.5 g of 2,2-bis(4-hydroxyphenyl)propane dissolved in 600 ml of a 3N-aqueous sodium hydroxide solution were introduced in one liter-flask. While the reaction solution was kept to a liquid temperature of about 10° C. by an external cooling means and was stirred vigorously, 340 ml/min of phosgene gas was bubbled therein for 30 minutes. Thereafter, stirring was continued for one hour to complete polymerization. After the completion of the reaction, the organic phase was diluted with 500 ml of methylene chloride. The obtained solution was washed successively with water, diluted hydrochloric acid and water, and was then poured in methanol to obtain a copolymer $((\eta_{sp}/c)=0.73$ dl/g) having the following structure and composition.

The copolymer was analyzed by an $^1$H-NMR spectrum, to obtain the following result: 1.46 (3H, t, J=7Hz), 1.70 (6H, s), 4.39 (2H, q, J=7Hz), 7.1–7.55 (17H, m), 7.61 (4H, dm, J=9Hz), 7.89 (1H, dd, J=8.5, 1.5Hz), 8.09 (1H, dt, J=7.5, 1.5Hz), 8.22 (1H, dd, J=1.5, 0.5Hz) (ppm). An IR spectrum analysis showed absorption due to benzene rings at 3030 cm$^{-1}$, 1590 cm$^{-1}$ and 830 cm$^{-1}$, absorption due to carbonyl groups at 1650 cm$^{-1}$ and absorption due to ether bonds at 1240 cm$^{-1}$, thereby indicating the presence of carbonate bonds. According to the results of these analyses, the copolymer was confirmed to have the following structure and composition.

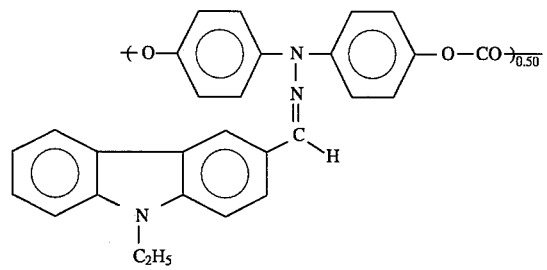

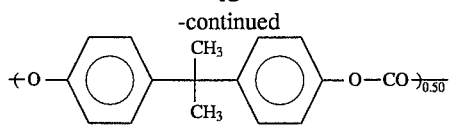

EXAMPLE 4

The procedure of Example 1 was repeated with the exception that 136 g of 9-ethylcarbazole-3-carbaldehyde-1', 1'-bis(4-hydroxyphenyl)hydrazone was used in place of 74 g of the 2,2-bis(4-hydroxyphenyl)propane used in Example 1, to obtain a polymer $((\eta_{sp}/c)=0.92$ dl/g) having the following structure. The structure and composition of the obtained polycarbonate were analyzed by an $^1$H-NMR spectrum, to obtain the following result: 1.46 (3H, t, J=7Hz), 4.39 (2H, q, J=7Hz), 7.2–7.55 (9H, m), 7.61 (4H, dm, J=9Hz), 7.89 (1H, dd, J=8.5, 1.5Hz ), 8.09 (1H, dt, J=7.5, 1.5Hz), 8.22 (1H, dd, J=1.5, 0.5Hz) (ppm). An IR spectrum analysis showed absorption due to benzene rings at 3030 cm$^{-1}$, 1590 cm$^{-1}$ and 830 cm$^{-1}$, absorption due to carbonyl groups at 1650 cm$^{-1}$ and absorption due to ether bonds at 1240 cm$^{-1}$, thereby indicating the presence of carbonate bonds. According to the results of these analyses, the polymer was confirmed to have the following structure.

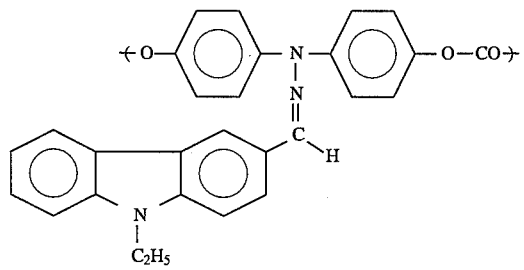

EXAMPLE 5

The procedure of Example 1 was repeated with the exception that 37.3 g of 2-naphthoaldehyde-1',1'-bis(3-hydroxyphenyl)hydrazone was used in place of 44.3 g of the 9-ethylcarbazole-3-carbaldehyde-1',1'-bis(4-hydroxyphenyl)hydrazone used in Example 1, to obtain a copolymer $((\eta_{sp}/c)=0.75$ dl/g) having the following structure and composition. An IR spectrum of the copolymer showed the same absorption as that of the copolymer obtained in Example 1 whereby the copolymer was confirmed to have the following structure and composition.

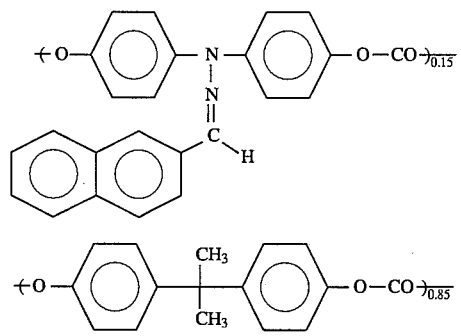

EXAMPLE 6

The procedure of Example 5 was repeated with the exception that 115 g of 2-naphthoaldehyde-1',1'-bis(3-hydroxyphenyl)hydrazone was used in place of 74 g of the 2,2-bis(4-hydroxyphenyl)propane used in Example 5, to obtain a polymer $((\eta_{sp}/c)=0.88$ dl/g) having the following structure and composition. An IR spectrum of the polymer showed the same absorption as that of the polymer obtained in Example 4, whereby the copolymer was confirmed to have the following structure.

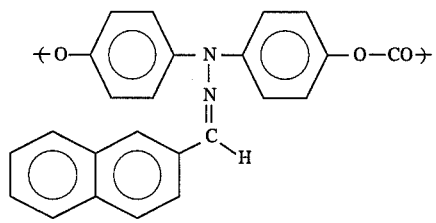

EXAMPLE 7

The procedure of Example 1 was repeated with the exception that 45.8 g of 1-phenyl-1,2,3,4-tetrahydroquinoline-6-carbaldehyde-1',1'-bis(4-hydroxyphenyl)hydrazone was used in place of 44.3 g of the 9-ethylcarbazole-3-carbaldehyde-1',1'-bis(4-hydroxyphenyl)hydrazone used in Example 1, to obtain a copolymer $((\eta_{sp}/c)=0.73$ dl/g) having the following structure and composition. An IR spectrum of the copolymer showed the same absorption as that of the polymer obtained in Example 1, whereby the copolymer was confirmed to have the following structure and composition.

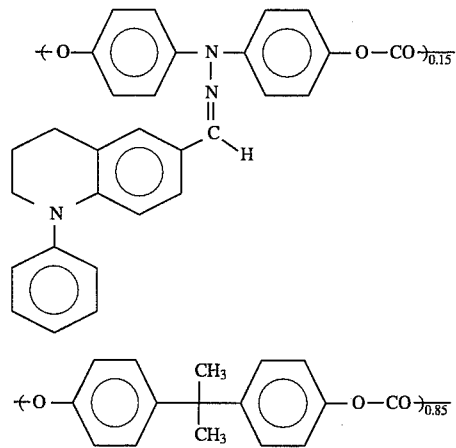

EXAMPLE 8

The procedure of Example 7 was repeated with the exception that 141 g of 1-phenyl-1,2,3,4-tetrahydroquinoline-6-carbaldehyde-1',1'-bis(4-hydroxyphenyl)hydrazone was used in place of 74 g of the 2,2-bis(4-hydroxyphenyl)propane used in Example 7, to obtain a polymer $((\eta_{sp}/c)=0.91$ dl/g) having the following structure. An IR spectrum of the polymer showed the same absorption as that of the polymer obtained in Example 4, whereby the polymer was confirmed to have the following structure.

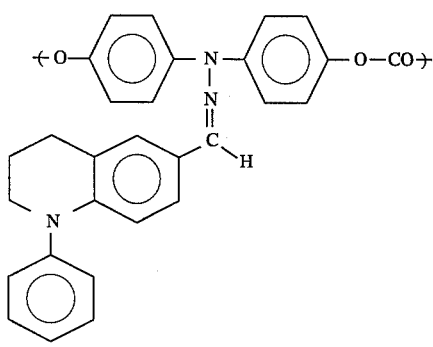

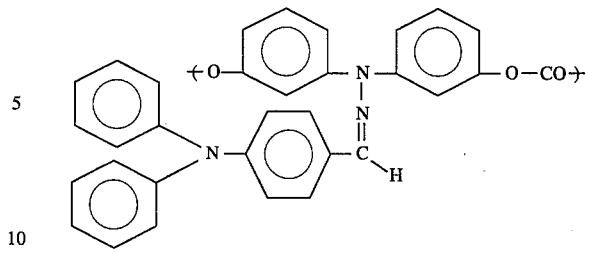

EXAMPLE 11

By using a hydrazone derivative having the following structure as a charge transporting material, a solution of the charge transporting material:the polycarbonate of Example 1:methylene chloride=1:1:8 (weight ratio) was prepared to use the solution as a coating liquid. One month of standing did not make the coating liquid get cloudy or gel. On a charge generation layer of about 20 μm which was a layer of oxotitanium phthalocyanine formed on a conductive substrate made of aluminum was formed a charge transport layer of about 0.1 μm by coating the charge generation layer with the coating liquid by a dip-coating technique and drying, to produce a layered-type electrophotographic photoreceptor. During the coating, crystallization did not occur in the charge transport layer.

The electrophotographic properties of the obtained electrophotographic photoreceptor were evaluated by carrying out a corona discharge of −6 kV and measuring initial surface potential ($V_o$), residual potential ($V_R$) after light irradiation (10 Lux, five seconds) and half-life exposure ($E_{1/2}$) by using an apparatus for testing static electricity charging (EPA-8100, trade name, produced by Kabushiki Kaisha Kawaguchi Denki Seisakusho). The results are listed in Table 1.

The abrasion resistance of the charge transport layer was evaluated by using a Suga Abrader. The evaluation was carried out by measuring the abrasion loss of a sample which was put into reciprocating motion 1200 times on an abrasion paper which was given a load of 200 g. The result is shown in Table 2.

EXAMPLE 9

The procedure of Example 1 was repeated with the exception that 49.6 g of p-diphenylaminobenzaldehyde-1', 1'-bis(3-hydroxyphenyl)hydrazone was used in place of 44.3 g of the 9-ethylcarbazole-3-carbaldehyde-1',1'-bis(4-hydroxyphenyl)hydrazone used in Example 1, to obtain a copolymer (($\eta_{sp}/c$)=0.78 dl/g) having the following structure. An IR spectrum of the copolymer showed the same absorption as that of the copolymer obtained in Example 1, whereby the copolymer was confirmed to have the following structure and composition.

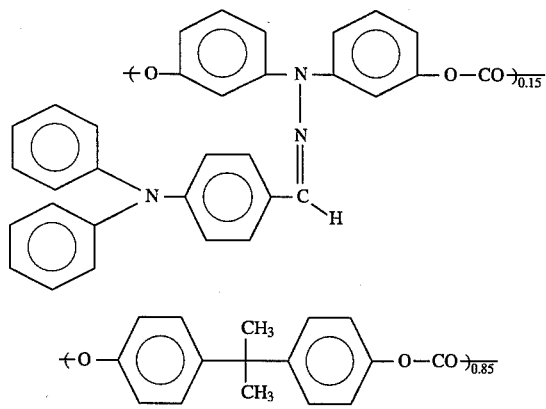

EXAMPLE 10

The procedure of Example 9 was repeated with the exception that 153 g of p-diphenylaminobenzaldehyde-1',1'-bis(3-hydroxyphenyl)hydrazone was used in place of 74 g of the 2,2-bis(4-hydroxyphenyl)propane used in Example 9, to obtain a polymer (($\eta_{sp}/c$)=0.89 dl/g) having the following structure. An IR spectrum of the polymer showed the same absorption as that of the polymer obtained in Example 4, whereby the polymer was confirmed to have the following structure.

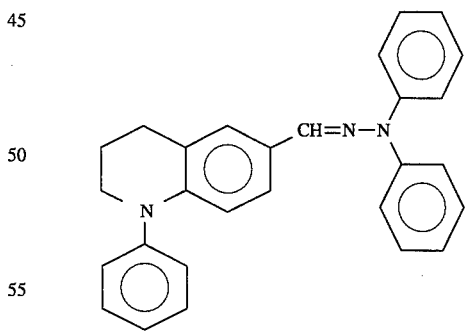

EXAMPLE 12

A layered-type electrophotographic photoreceptor was produced in the same manner as in Example 11 with the exception that the polycarbonate obtained in Example 2 was used. The evaluation result of the stability of the prepared coating liquid and the evaluation result of crystallization during coating were the same as those in Example 11. The results of evaluations of electrophotographic properties and abrasion resistance are listed in Table 1 and Table 2.

EXAMPLE 13

A layered-type electrophotographic photoreceptor was produced in the same manner as in Example 11 with the exception that the polycarbonate obtained in Example 3 was used. The evaluation result of the stability of the prepared coating liquid and the evaluation result of crystallization during coating were the same as those in Example 11. The results of evaluations of electrophotographic properties and abrasion resistance are listed in Table 1 and Table 2.

EXAMPLE 14

A layered-type electrophotographic photoreceptor was produced in the same manner as in Example 11 with the exception that the polycarbonate obtained in Example 4 was used. The evaluation result of the stability of the prepared coating liquid and the evaluation result of crystallization during coating were the same as those in Example 11. The results of evaluations of electrophotographic properties and abrasion resistance are listed in Table 1 and Table 2.

EXAMPLE 15

A layered-type electrophotographic photoreceptor was produced in the same manner as in Example 11 with the exception that the polycarbonate obtained in Example 5 was used. The evaluation result of the stability of the prepared coating liquid and the evaluation result of crystallization during coating were the same as those in Example 11. The results of evaluations of electrophotographic properties and abrasion resistance are listed in Table 1 and Table 2.

EXAMPLE 16

A layered-type electrophotographic photoreceptor was produced in the same manner as in Example 11 with the exception that the polycarbonate obtained in Example 7 was used. The evaluation result of the stability of the prepared coating liquid and the evaluation result of crystallization during coating were the same as those in Example 11. The results of evaluations of electrophotographic properties and abrasion resistance are listed in Table 1 and Table 2.

EXAMPLE 17

A layered-type electrophotographic photoreceptor was produced in the same manner as in Example 11 with the exception that the polycarbonate obtained in Example 9 was used. The evaluation result of the stability of the prepared coating liquid and the evaluation result of crystallization during coating were the same as those in Example 11. The results of evaluations of electrophotographic properties and abrasion resistance are listed in Table 1 and Table 2.

EXAMPLE 18

A layered-type electrophotographic photoreceptor was produced in the same manner as in Example 11 with the exception that a 10% by weight solution of the polycarbonate obtained in Example 3 (as a charge transporting material) dissolved in methylene chloride was prepared and used. The evaluation result of the stability of the prepared coating liquid and the evaluation result of crystallization during coating were the same as those in Example 11. The results of evaluations of electrophotographic properties and abrasion resistance are listed in Table 1 and Table 2.

EXAMPLE 19

A layered-type electrophotographic photoreceptor was produced in the same manner as in Example 11 with the exception that a 10% by weight solution of the polycarbonate in Example 4 (as a charge transporting material) dissolved in methylene chloride was prepared and used. The evaluation result of the stability of the prepared coating liquid and the evaluation result of crystallization during coating were the same as those in Example 11. The results of evaluations of electrophotographic properties and abrasion resistance are listed in Table 1 and Table 2.

EXAMPLE 20

A layered-type electrophotographic photoreceptor was produced in the same manner as in Example 11 with the exception that a 10% by weight solution of the polycarbonate in Example 6 (as a charge transporting material) dissolved in methylene chloride was prepared and used. The evaluation result of the stability of the prepared coating liquid and the evaluation result of crystallization during coating were the same as those in Example 11. The results of evaluations of electrophotographic properties and abrasion resistance are listed in Table 1 and Table 2.

EXAMPLE 21

A layered-type electrophotographic photoreceptor was produced in the same manner as in Example 11 with the exception that a 10% by weight solution of the polycarbonate in Example 8 (as a charge transporting material) dissolved in methylene chloride was prepared and used. The evaluation result of the stability of the prepared coating liquid and the evaluation result of crystallization during coating were the same as those in Example 11. The results of evaluations of electrophotographic properties and abrasion resistance are listed in Table 1 and Table 2.

EXAMPLE 22

A layered-type electrophotographic photoreceptor was produced in the same manner as in Example 11 with the exception that a 10% by weight solution of the polycarbonate in Example 10 (as a charge transporting material) dissolved in methylene chloride was prepared and used. The evaluation result of the stability of the prepared coating liquid and the evaluation result of crystallization during coating were the same as those in Example 11. The results of evaluations of electrophotographic properties and abrasion resistance are listed in Table 1 and Table 2.

COMPARATIVE EXAMPLE 1

A layered-type electrophotographic photoreceptor was produced in the same manner as in Example 11 with the exception that a commercial polycarbonate ($[\eta_{sp}/c]=0.78$ dl/g) prepared from 2,2-bis(4-hydroxyphenyl)propane was used. The prepared coating liquid got cloudy and geled two days after. During coating, a part of the charge transport layer crystallized (got cloudy). The results of evaluations of electrophotographic properties and abrasion resistance are listed in Table 1, Table 2, Table 3 and Table 4.

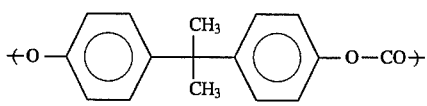

COMPARATIVE EXAMPLE 2

A layered-type electrophotographic photoreceptor was produced in the same manner as in Example 11 with the exception that a hydrazone derivative having the following structure was used as a charge transporting material, and the polycarbonate used in Comparative Example 1 was used as a binder resin. The prepared coating liquid got cloudy and geled two days after. During coating, a part of the charge transport layer crystallized (got cloudy). The results of evaluations of electrophotographic properties and abrasion resistance are listed in Table 1 and Table 2.

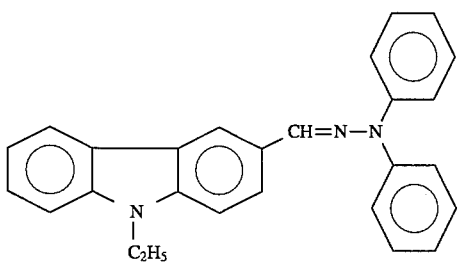

COMPARATIVE EXAMPLE 3

A layered-type electrophotographic photoreceptor was produced in the same manner as in Example 11 with the exception that a hydrazone derivative having the following structure was used as a charge transporting material, and the polycarbonate used in Comparative Example 1 was used as a binder resin. The prepared coating liquid got cloudy and geled two days after. During coating, a part of the charge transport layer crystallized (got cloudy). The results of evaluations of electrophotographic properties and abrasion resistance are listed in Table 1, Table 2, Table 3 and Table 4.

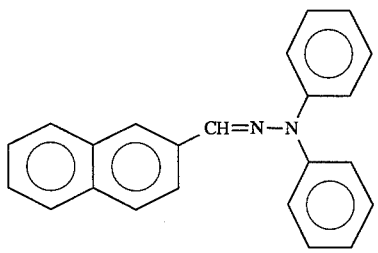

COMPARATIVE EXAMPLE 4

A layered-type electrophotographic photoreceptor was produced in the same manner as in Example 11 with the exception that a hydrazone derivative having the following structure was used as a charge transporting material, and the polycarbonate used in Comparative Example 1 was used as a binder resin. The prepared coating liquid got cloudy and geled two days after. During coating, a part of the charge transport layer crystallized (got cloudy). The results of evaluations of electrophotographic properties and abrasion resistance are listed in Table 1 and Table 2.

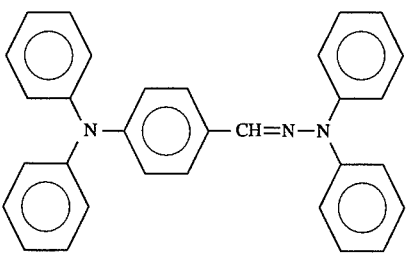

TABLE 1

|  | Initial surface potential $V_O$ (V) | Residual potential $V_R$ (V) | Half-life exposure $E_{1/2}$ (Lux · sec) |
|---|---|---|---|
| Example 11 | −754 | −2 | 0.82 |
| Example 12 | −745 | −3 | 0.83 |
| Example 13 | −734 | −6 | 0.81 |
| Example 14 | −763 | −3 | 0.82 |
| Example 15 | −787 | −5 | 0.82 |
| Example 16 | −743 | −2 | 0.81 |
| Example 17 | −770 | −5 | 0.84 |
| Example 18 | −741 | −3 | 0.77 |
| Example 19 | −765 | −2 | 0.78 |
| Example 20 | −774 | −4 | 0.75 |
| Example 21 | −765 | −3 | 0.73 |
| Example 22 | −756 | −3 | 0.73 |
| Comparative example 1 | −752 | −3 | 0.84 |
| Comparative example 2 | −776 | −5 | 0.89 |
| Comparative example 3 | −754 | −3 | 0.88 |
| Comparative example 4 | −734 | −6 | 0.87 |

TABLE 2

|  | Abrasion loss (mg) |  | Abrasion loss (mg) |
|---|---|---|---|
| Example 11 | 1.77 | Comparative example 1 | 2.28 |
| Example 12 | 1.69 | Comparative example 2 | 2.45 |
| Example 13 | 1.60 | Comparative example 3 | 2.36 |
| Example 14 | 1.55 | Comparative example 4 | 2.55 |
| Example 15 | 1.74 |  |  |
| Example 16 | 1.76 |  |  |
| Example 17 | 1.76 |  |  |
| Example 18 | 1.45 |  |  |
| Example 19 | 1.36 |  |  |
| Example 20 | 1.32 |  |  |
| Example 21 | 1.31 |  |  |
| Example 22 | 1.28 |  |  |
| Example 23 |  |  |  |

EXAMPLE 23

28 g of 2,4-dihydroxybenzaldehyde and 24 g of 1-methyl-1-phenylhydrazine were dissolved in 500 ml of ethanol, and the solution was heated and refluxed for two hours. After the solvent was distilled off from the reaction solution, the product was recrystallized from chloroform and was collected in a yield of 35 g. The obtained product was analyzed by an $^1$H-NMR, to obtain the following result: 3.49 (3H, s), 6.30 (1H, d, J=2Hz), 6.38 (1H, dd, J=8.2Hz), 7.8–7.4 (6H, m), 7.73 (1H, s) (ppm), whereby the product was confirmed to be 2,4-dihydroxybenzaldehyde-N-methyl-N-phenylhydrazone having the following structure.

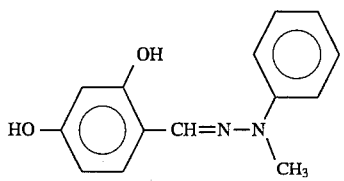

74 g of 2,2-bis(4-hydroxyphenyl)propane was dissolved in 550 ml of 6%-aqueous sodium hydroxide solution, and 250 ml of methylene chloride was added thereto. While the obtained solution was stirred and cooled, 950 ml/min of phosgene gas was bubbled therein for 15 minutes. The reaction liquid was allowed to stand to separate an inorganic phase, which was a methylene chloride solution of an oligomer of 2 to 4 polymerization degree having chloroformate groups at molecular ends. The obtained methylene chloride solution of the oligomer was diluted to 450 ml with methylene chloride, and was then mixed with a solution of 25.4 g of 2,4-dihydroxybenzaldehyde-N-methyl-N-phenyl-hydrazone dissolved in 150 ml of a 8%-aqueous sodium hydroxide solution. To the mixture was added 3.0 g of p-tert-butylphenol as an agent for controlling molecular weight. While the solution mixture was stirred vigorously, 2 ml of a 7%-aqueous triethylamine solution as a catalyst was added thereto, and reaction was then carried out for 1.5 hours at 28° C., with stirring. After the completion of the reaction, the reaction product was diluted with one liter of methylene chloride and was then washed successively with two 1.5 liter portions of water, one liter of 0.01N hydrochloric acid and two one liter portions of water, and reprecipitation was carried out by pouring the organic phase in methanol.

The obtained copolymer (Yield: 80 g) had a reduced viscosity ($\eta_{sp}/c$) of 0.84 dl/g, measured at 20° C. as a solution of 0.5 g/dl concentration in methylene chloride. The copolymer was analyzed by an $^1$H-NMR spectrum, to obtain the following result: 1.70 (6H, s), 3.46 (0.53H, s), 6.94 (0.18H, t, J=8Hz), 7.05–7.45 (9.1H, m), 7.58 (0.18H, s), 8.04 (0.18H, d, J=8Hz) (ppm). An IR spectrum analysis showed absorption due to benzene rings at 3030 cm$^{-1}$, 1590 cm$^{-1}$ and 830 cm$^{-1}$, absorption due to carbonyl groups at 1650 cm$^{-1}$ and absorption due to ether bonds at 1240 cm$^{-1}$, thereby indicating the presence of carbonate bonds. According to the results of these analyses, the copolymer was confirmed to have the following repeating units.

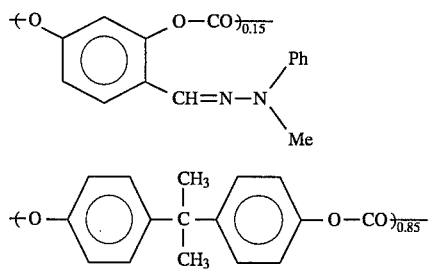

EXAMPLE 24

The procedure of Example 23 was repeated with the exception that 87 g of 1,1-bis(4-hydroxyphenyl)cyclohexane was used in place of 74 g of the 2,2-bis(4-hydroxyphenyl)propane used in Example 23, to obtain 75 g of a copolymer (($\eta_{sp}/c$)=0.72 dl/g). An IR spectrum of the copolymer showed the same absorption as that of the copolymer obtained in Example 23, whereby the copolymer was confirmed to have the following structure and composition.

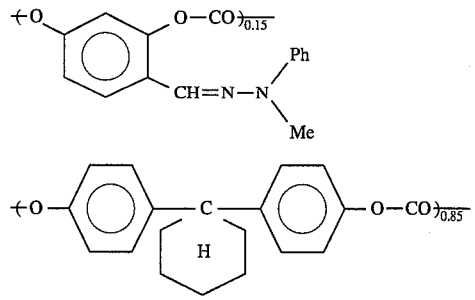

EXAMPLE 25

28 g of 2,4-dihydroxybenzaldehyde and 44 g of hydrochloric acid salt of diphenylhydrazine were dissolved in 500 ml of ethanol, and the solution was heated and refluxed for two hours. After the solvent was distilled off from the reaction solution, the product was recrystallized from chloroform and was collected in a yield of 48 g. The obtained product was analyzed by an $^1$H-NMR, to obtain the following result: 6.30 (1H, d, J=2Hz), 6.39 (1H, dd, J=8.2Hz), 7.8–7.4 (11H, m), 7.77 (1H, s) (ppm), whereby the product was confirmed to be 2,4-dihydroxybenzaldehyde-N,N-diphenylhydrazone having the following structure.

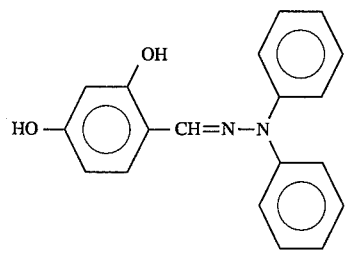

The procedure of Example 23 was repeated with the exception that 31.9 g of 2,4-dihydroxybenzaldehyde-N,N-diphenylhydrazone was used in place of 25.4 g of the 2,4-dihydroxybenzaldehyde-N-methyl-N-phenylhydrazone used in Example 23, to obtain 78 g of a copolymer (($\eta_{sp}/c$)=0.75 dl/g). An IR spectrum of the copolymer showed the same absorption as that or the copolymer obtained in Example 23, whereby the copolymer was confirmed to have the following structure and composition.

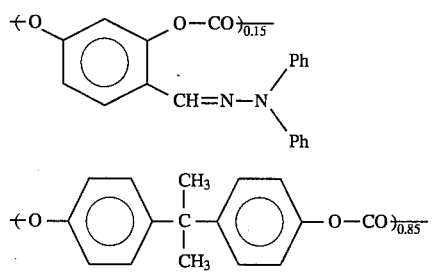

EXAMPLE 26

28 g of 2,5-dihydroxybenzaldehyde and 24 g of 1-methyl-1-phenylhydrazine were dissolved in 500 ml of ethanol, and the solution was heated and refluxed for two hours. After the solvent was distilled off from the reaction solution, the product was recrystallized from chloroform and was collected in a yield of 30 g. The obtained product was analyzed by an ¹H-NMR, to obtain the following result: 3.36 (3H, s), 6.6–7.5 (8H, m), 7.66 (1H, s) (ppm), whereby the product was confirmed to be 2,5-dihydroxybenzaldehyde-N-methyl-N-phenylhydrazone having the following structure.

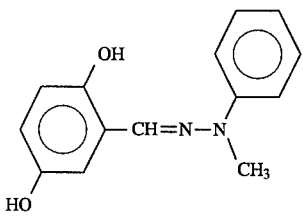

The procedure of Example 23 was repeated with the exception that 31.9 g of 2,5-dihydroxybenzaldehyde-N-methyl-N-phenylhydrazone was used in place of 25.4 g of the 2,4-dihydroxybenzaldehyde-N-methyl-N-phenylhydrazone used in Example 23, to obtain 82 g of a copolymer (($\eta_{sp}/c$)=0.63 dl/g). An IR spectrum of the copolymer showed the same absorption as that of the copolymer obtained in Example 23, whereby the copolymer was confirmed to have the following structure and composition.

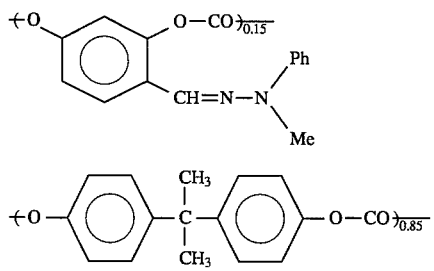

EXAMPLE 27

38 g of 1,4-dihydroxy-2-naphthoaldehyde and 44 g of hydrochloric acid salt of diphenylhydrazine were dissolved in 500 ml of ethanol, and the solution was heated and refluxed for two hours. After the solvent was distilled off from the reaction solution, the product was recrystallized from chloroform and was collected in a yield of 50 g. The obtained product was analyzed by an ¹-NMR, to obtain the following result: 6.8–7.7 (15H, m), 7.74 (1H, s) (ppm), whereby the product was confirmed to be 1,4-dihydroxy-2-naphthoaldehyde-N,N-diphenylhydrazone having the following structure.

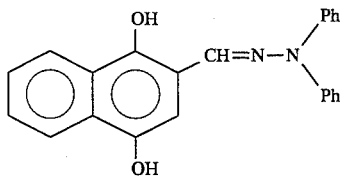

The procedure of Example 23 was repeated with the exception that 37.2 g of 1,4-dihydroxy-2-naphthoaldehyde-N,N-diphenylhydrazone was used in place of 25.4 g of the 2,4-dihydroxybenzaldehyde-N-methyl-N-phenylhydrazone used in Example 23, to obtain 78 g of a copolymer (($\eta_{sp}/c$)=0.73 dl/g). An IR spectrum of the copolymer showed the same absorption as that of the copolymer obtained in Example 23, whereby the copolymer was confirmed to have the following structure and composition.

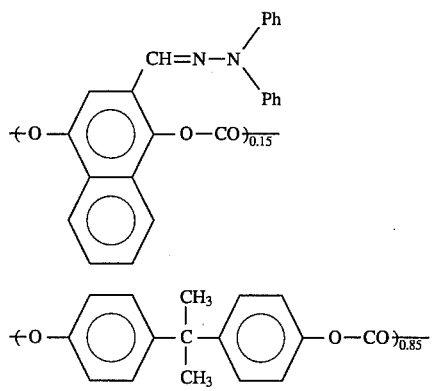

EXAMPLE 28

55 g of 9-ethyl-3,6-dihydroxycarbazole-1-carboaldehyde and 44 g of hydrochloric acid salt of diphenylhydrazine were dissolved in 500 ml of ethanol, and the solution was heated and refluxed for two hours. After the solvent was distilled off from the reaction solution, the product was recrystallized from chloroform and was collected in a yield of 45 g. The obtained product was analyzed by an ¹H-NMR, to obtain the following result: 1.44 (3H, s), 4.36 (2H, s), 6.6–8.5 (16H, m) (ppm), whereby the product was confirmed to be 9-ethyl-3,6-dihydroxy-carbazole- 1-carboaldehyde-N,N-diphenylhydrazone having the following structure.

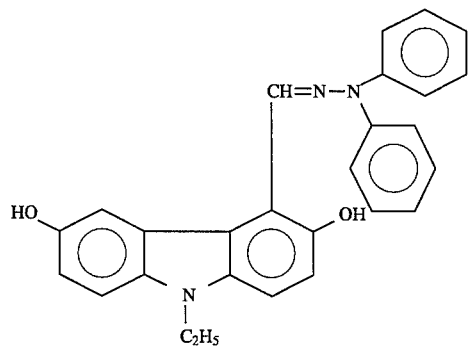

The procedure of Example 23 was repeated with the exception that 44.2 g of 9-ethyl-3,6-dihydroxycarbazole-1-carbaldehyde-N,N-diphenylhydrazone was used in place of 25.4 g of the 2,4-dihydroxybenzaldehyde-N-methyl-N-phenylhydrazone used in Example 23, to obtain 86 g of a copolymer (($\eta_{sp}/c$)=0.81 dl/g). An IR spectrum of the copolymer showed the same absorption as that of the copolymer obtained in Example 23, whereby the copolymer was confirmed to have the following structure and composition.

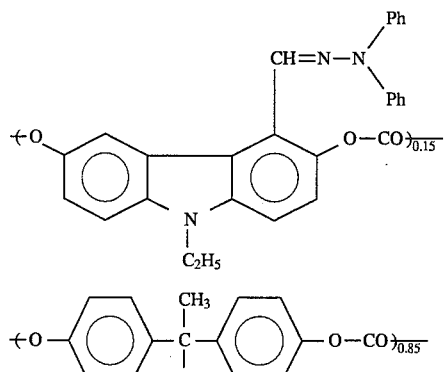

EXAMPLE 29

250 ml of methylene chloride and a solution of 30.3 g of 2,4-dihydroxybenzaldehyde-N-methyl-N-phenylhydrazone and 28.5 g of 2,2-bis(4-hydroxyphenyl)propane dissolved in 600 ml of a 3N-aqueous sodium hydroxide solution were introduced in a one liter-flask. While the reaction solution was kept to a liquid temperature of about 10° C. by an external cooling means and was stirred vigorously, 340 ml/min of phosgene gas was bubbled therein for 30 minutes. Thereafter, stirring was continued for one hour to complete polymerization. After the completion of the reaction, the organic phase was diluted with 500 ml of methylene chloride. The solution was washed successively with water, diluted hydrochloric acid and water, and was then poured in methanol to obtain 75 g of a copolymer (($\eta_{sp}/c$)=0.88 dl/g).

The copolymer was analyzed by an $^1$H-NMR spectrum, to obtain the following result: 1.70 (6H, s), 3.46 (3H, s), (6.94 (1H, t, J=8Hz), 7.05–7.45 (14H, m), 7.58 (1H, s), 8.04 (1H, d, J=8Hz) (ppm). An IR spectrum analysis showed absorption due to benzene rings at 3030 cm$^{-1}$, 1590 cm$^{-1}$ and 830 cm$^{-1}$, absorption due to carbonyl groups at 1650 cm$^{-1}$ and absorption due to ether bonds at 1240 cm$^{-1}$, thereby indicating the presence of carbonate bonds. According to the results of these analyses, the copolymer was confirmed to have the following repeating units.

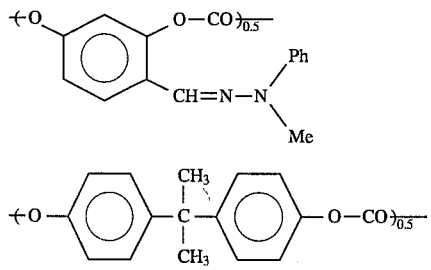

EXAMPLE 29

G,89

The procedure of Example 29 was repeated with the exception that 44.3 g of 1,4-dihydroxy-2-naphthoaldehyde-N,N-diphenylhydrazone was used in place of 30.3 g of the 2,4-dihydroxybenzaldehyde -N-methyl-N-phenylhydrazone used in Example 29, to obtain 70 g of a copolymer (($\eta_{sp}/$ c)=0.87 dl/g). An IR spectrum of the copolymer showed the same absorption as that of the copolymer obtained in Example 29, whereby the copolymer was confirmed to have the following structure and composition.

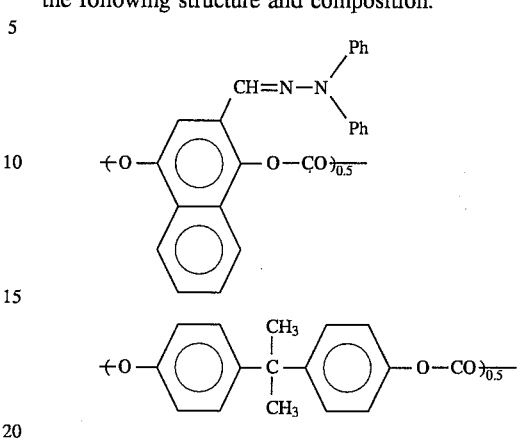

EXAMPLE 31

The procedure of Example 23 was repeated with the exception that 78.7 g of 2,4-dihydroxybenzaldehyde-N-methyl-N-phenylhydrazone was used in place of 74 g of the 2,2-bis(4-hydroxyphenyl)propane used in Example 23, to obtain 75 g of a polymer (($\eta_{sp}/c$)=0.81 dl/g). An IR spectrum of the polymer showed the same absorption as that of the polymer obtained in Example 23, whereby the polymer was confirmed to have the following structure and composition.

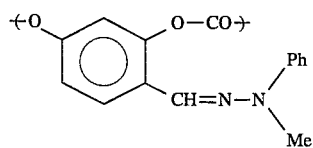

EXAMPLE 32

The procedure of Example 23 was repeated with the exception that 115 g of 1,4-dihydroxy-2-naphthoaldehyde-N,N-diphenylhydrazone was used in place of 74 g of the 2,2 -bis(4-hydroxyphenyl)propane, and 37.2 g of 1,4-dihydroxy-2 -naphthoaldehyde-N,N-diphenylhydrazone was used in place of 25.4 g of 2,4-dihydroxybenzaldehyde-N-methyl-N-phenylhydrazone, to obtain 76 g of a polymer (($\eta_{sp}/c$)=0.82 dl/g). An IR spectrum of the polymer showed the same absorption as that of the polymer obtained in Example 23 whereby the polymer was confirmed to have the following structure and composition.

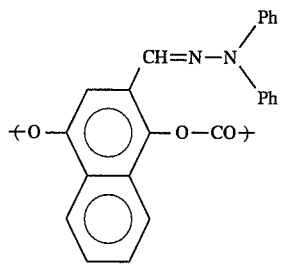

EXAMPLE 33

A layered-type electrophotographic photoreceptor was produced in the same manner as in Example b 11with the exception that the polycarbonate obtained in Example 23 was used. The evaluation result of the stability of the prepared coating liquid and the evaluation result of crystallization during coating were the same as those in Example 11. The results of evaluations of electrophotographic properties and abrasion resistance are listed in Table 3 and Table 4.

EXAMPLE 34

A layered-type electrophotographic photoreceptor was produced in the same manner as in Example 11 with the exception that the polycarbonate obtained in Example 24 was used. The evaluation result of the stability of the prepared coating liquid and the evaluation result of crystallization during coating were the same as those in Example 11. The results of evaluations of electrophotographic properties and abrasion resistance are listed in Table 3 and Table 4.

EXAMPLE 35

A layered-type electrophotographic photoreceptor was produced in the same manner as in Example 11 with the exception that the polycarbonate obtained in Example 25 was used. The evaluation result of the stability of the prepared coating liquid and the evaluation result of crystallization during coating were the same as those in Example 11. The results of evaluations of electrophotographic properties and abrasion resistance are listed in Table 3 and Table 4.

EXAMPLE 36

A layered-type electrophotographic photoreceptor was produced in the same manner as in Example 11 with the exception that the polycarbonate obtained in Example 26 was used. The evaluation result of the stability of the prepared coating liquid and the evaluation result of crystallization during coating were the same as those in Example 11. The results of evaluations of electrophotographic properties and abrasion resistance are listed in Table 3 and Table 4.

EXAMPLE 37

A layered-type electrophotographic photoreceptor was produced in the same manner as in Example 11 with the exception that the polycarbonate obtained in Example 27 was used. The evaluation result of the stability of the prepared coating liquid and the evaluation result of crystallization during coating were the same as those in Example 11. The results of evaluations of electrophotographic properties and abrasion resistance are listed in Table 3 and Table 4.

EXAMPLE 38

A layered-type electrophotographic photoreceptor was produced in the same manner as in Example 11 with the exception that the polycarbonate obtained in Example 28 was used. The evaluation result of the stability of the prepared coating liquid and the evaluation result of crystallization during coating were the same as those in Example 11. The results of evaluations of electrophotographic properties and abrasion resistance are listed in Table 3 and Table 4.

EXAMPLE 39

A layered-type electrophotographic photoreceptor was produced in the same manner as in Example 11 with the exception that the polycarbonate obtained in Example 29 was used. The evaluation result of the stability of the prepared coating liquid and the evaluation result of crystallization during coating were the same as those in Example 11. The results of evaluations of electrophotographic properties and abrasion resistance are listed in Table 3 and Table 4.

EXAMPLE 40

A layered-type electrophotographic photoreceptor was produced in the same manner as in Example 11 with the exception that the polycarbonate obtained in Example 30 was used. The evaluation result of the stability of the prepared coating liquid and the evaluation result of crystallization during coating were the same as those in Example 11. The results of evaluations of electrophotographic properties and abrasion resistance are listed in Table 3 and Table 4.

EXAMPLE 41

A layered-type electrophotographic photoreceptor was produced in the same manner as in Example 11 with the exception that the polycarbonate obtained in Example 29 was used as a charge transporting material in place of the hydrazone derivative used in Example 11 and was dissolved in methylene chloride in a concentration of 20% by weight, to use the solution as a coating liquid. The evaluation result of the stability of the prepared coating liquid and the evaluation result of crystallization during coating were the same as those in Example 11. The results of evaluations of electrophotographic properties and abrasion resistance are listed in Table 3 and Table 4.

EXAMPLE 42

A layered-type electrophotographic photoreceptor was produced in the same manner as in Example 11 with the exception that the polycarbonate obtained in Example 30 was used as a charge transporting material in place of the hydrazone derivative used in Example 11 and was dissolved in methylene chloride in a concentration of 20% by weight, to use the solution as a coating liquid. The evaluation result of the stability of the prepared coating liquid and the evaluation result of crystallization during coating were the same as those in Example 11. The results of evaluations of electrophotographic properties and abrasion resistance are listed in Table 3 and Table 4.

EXAMPLE 43

A layered-type electrophotographic photoreceptor was produced in the same manner as in Example 11 with the exception that the polycarbonate obtained in Example 31 was used as a charge transporting material in place of the hydrazone derivative used in Example 11 and was dissolved in methylene chloride in a concentration of 20% by weight, to use the solution as a coating liquid. The evaluation result of the stability of the prepared coating liquid and the evaluation result of crystallization during coating were the same as those in Example 11. The results of evaluations of electrophotographic properties and abrasion resistance are listed in Table 3 and Table 4.

EXAMPLE 44

A layered-type electrophotographic photoreceptor was produced in the same manner as in Example 11 with the exception that the polycarbonate obtained in Example 32 was used as a charge transporting material in place of the hydrazone derivative used in Example 11 and was dissolved in methylene chloride in a concentration of 20% by weight, to use the solution as a coating liquid. The evaluation result of the stability of the prepared coating liquid and the evaluation result of crystallization during coating were the same as those in Example 11. The results of evaluations of electrophotographic properties and abrasion resistance are listed in Table 3 and Table 4.

COMPARATIVE EXAMPLE 5

The procedure of Example 23 was repeated with the exception that 87 g of 1,1-bis(4-hydroxyphenyl)cyclohexane was used in place of 74 g of the 2,2-bis(4-hydroxyphenyl)propane, and 35 g of 1,1-bis(4-hydroxyphenyl)cyclohexane was used in place of 25.4 g of the 2,4-dihydroxybenzaldehyde-N-methyl-N-phenylhydrazone, to obtain a polycarbonate (($\eta_{sp}/c$)=0.84 dl/g) having the following structure. A layered-type electrophotographic photoreceptor was produced in the same manner as in Example 33 by using the polycarbonate. The evaluation result of the stability of the prepared coating liquid and the evaluation result of crystallization during coating were the same as those in Example 11. The results of evaluations of electrophotographic properties and abrasion resistance are listed in Table 3 and Table 4.

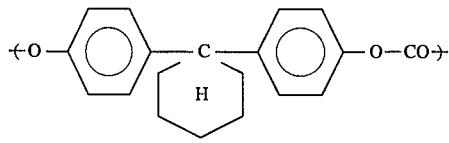

COMPARATIVE EXAMPLE 6

A layered-type electrophotographic photoreceptor was produced in the same manner as in Example 11 with the exception that a hydrazone derivative having the following structure was used as a charge transporting material, and the polycarbonate used in Comparative Example 1 was used as a binder resin. The prepared coating liquid got cloudy and geled two days after. During coating, a part of the charge transport layer crystallized (got cloudy). The results of evaluations of electrophotographic properties and abrasion resistance are listed in Table 3 and Table 4.

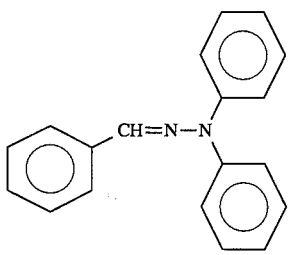

TABLE 3

|  | Initial surface potential $V_O$ (V) | Residual potential $V_R$ (V) | Half-life exposure $E_{1/2}$ (Lux · sec) |
|---|---|---|---|
| Example 33 | −752 | −2 | 0.83 |
| Example 34 | −742 | −4 | 0.84 |
| Example 35 | −763 | −7 | 0.82 |
| Example 36 | −734 | −2 | 0.85 |
| Example 37 | −786 | −3 | 0.86 |
| Example 38 | −744 | −4 | 0.86 |
| Example 39 | −775 | −6 | 0.82 |
| Example 40 | −746 | −7 | 0.83 |
| Example 41 | −773 | −6 | 0.71 |
| Example 42 | −774 | −2 | 0.71 |
| Example 43 | −763 | −7 | 0.72 |
| Example 44 | −754 | −7 | 0.71 |
| Comparative example 1 | −752 | −3 | 0.84 |
| Comparative example 3 | −754 | −3 | 0.88 |
| Comparative example 5 | −732 | −4 | 0.85 |
| Comparative example 6 | −740 | −4 | 0.86 |

TABLE 4

|  | Abrasion loss (mg) |  | Abrasion loss (mg) |
|---|---|---|---|
| Example 33 | 1.52 | Comparative example 1 | 2.28 |
| Example 34 | 1.59 | Comparative example 3 | 2.36 |
| Example 35 | 1.60 |  |  |
| Example 36 | 1.55 |  |  |
| Example 37 | 1.49 | Comparative example 5 | 1.78 |
| Example 38 | 1.55 |  |  |
| Example 39 | 1.32 | Comparative example 6 | 2.12 |
| Example 40 | 1.36 |  |  |
| Example 41 | 1.15 |  |  |
| Example 42 | 1.13 |  |  |
| Example 43 | 1.17 |  |  |
| Example 44 | 1.15 |  |  |

INDUSTRIAL APPLICABILITY

The polyester polymer of the present invention, due to its excellent mechanical strength, such as high abrasion resistance, and good photoconductivity, is usable in various application fields of polymer materials, including the fields of producing electrophotographic photoreceptors or EL devices. Using the polyester polymer as both a charge transporting material and a binder resin, or as a binder resin in the photosensitive layer of electrophotographic photoreceptors facilitates production of electrophotographic photoreceptors which contain a photosensitive layer excelling particularly in plate wear and electrophotographic properties.

We claim:

1. A polyester polymer comprising repeating units (I) represented by the following general formula (I)

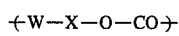 (I)

wherein W is —O— or a single bond, X is
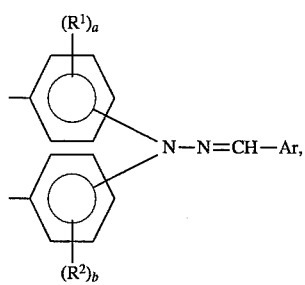
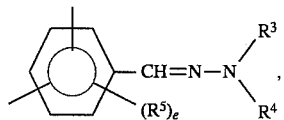
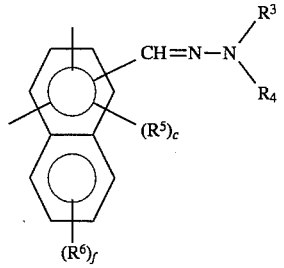
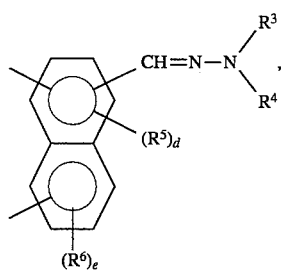
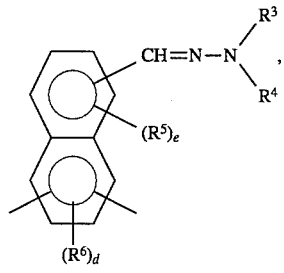
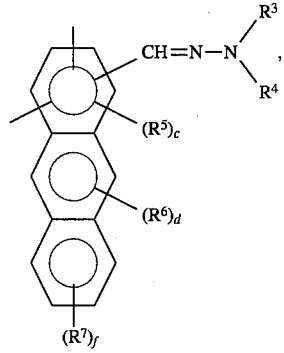
-continued
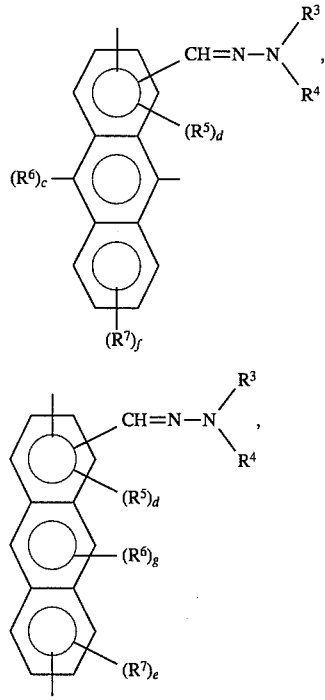
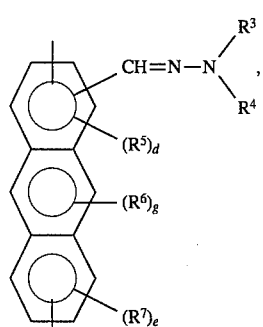
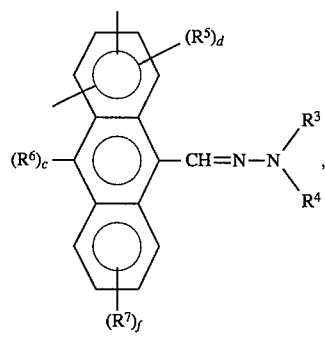
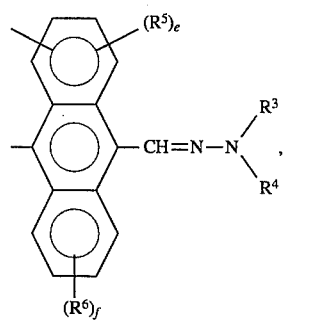
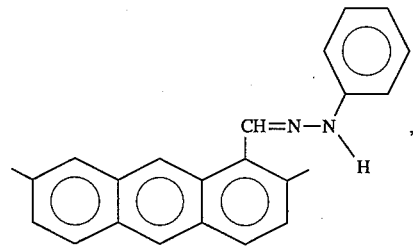

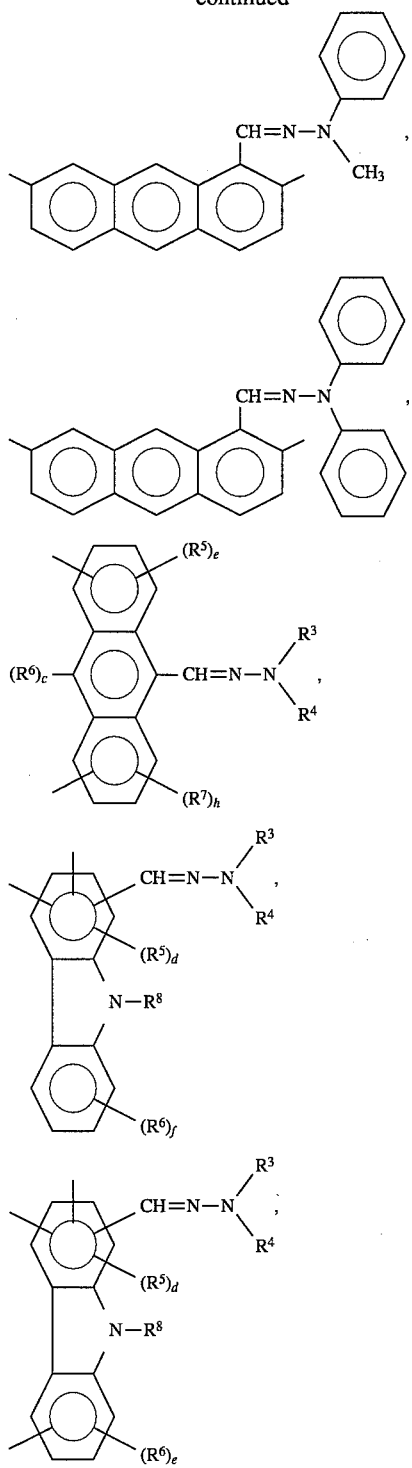
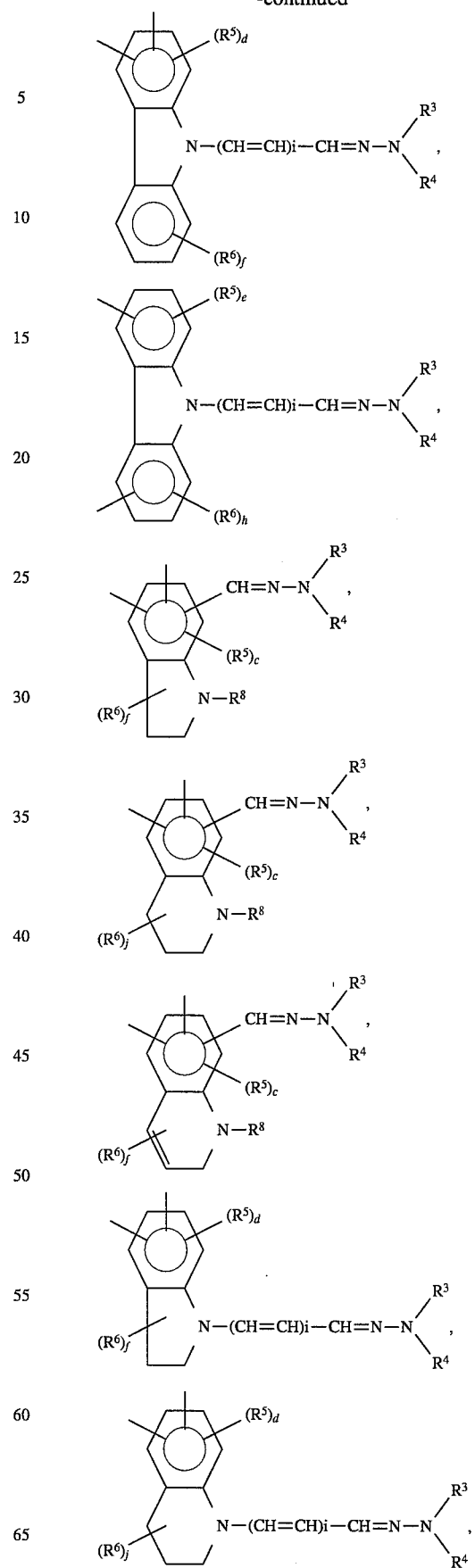

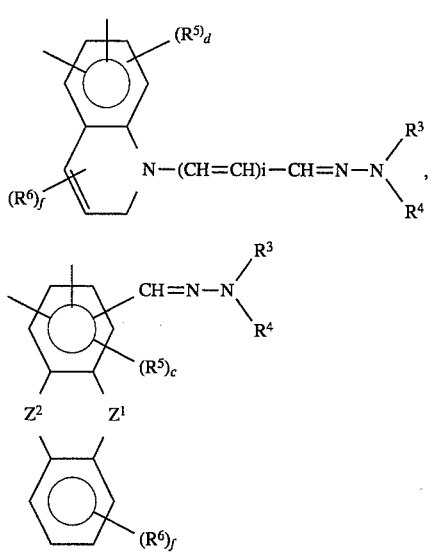
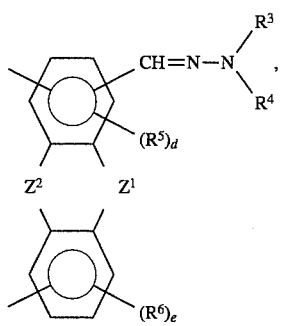
or
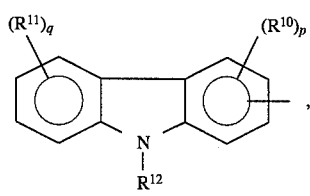
wherein each of $R^1$ and $R^2$ respectively is a halogen atom, an alkyl group of 1 to 6 carbon atoms or an aryl group of 6 to 12 carbon atoms, each of a and b respectively is an integer of 0 to 4, Ar is
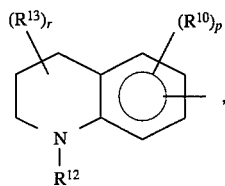
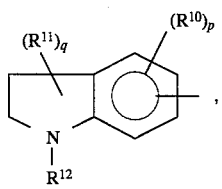
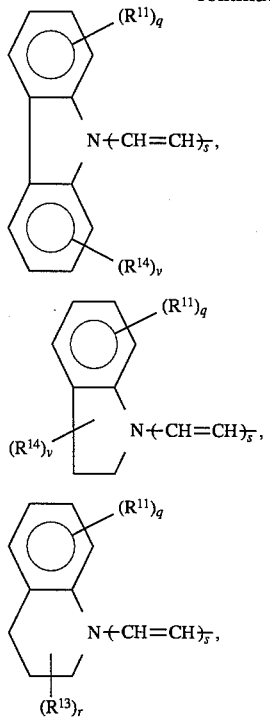
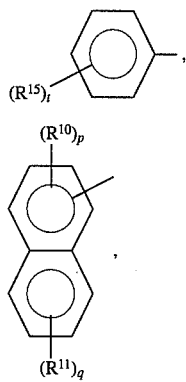
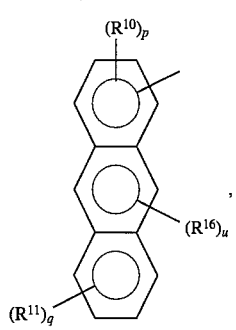
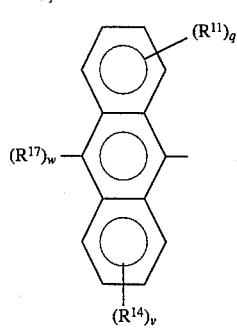

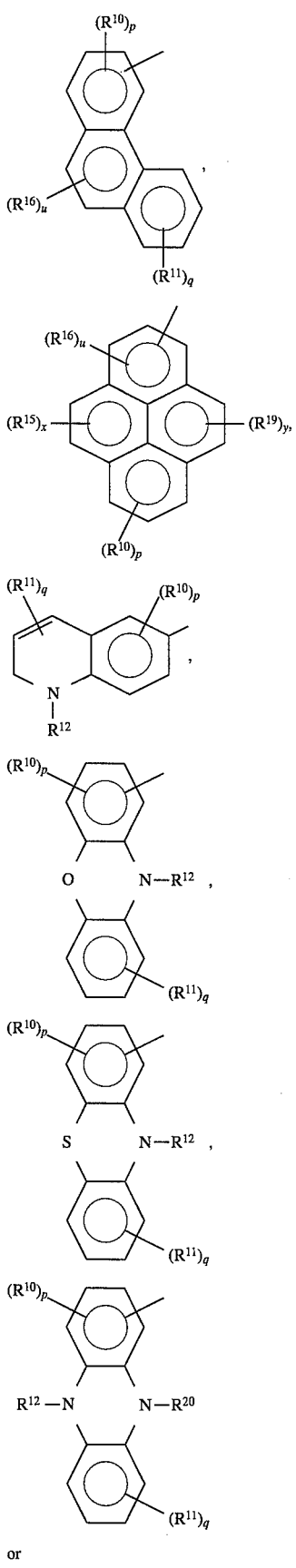

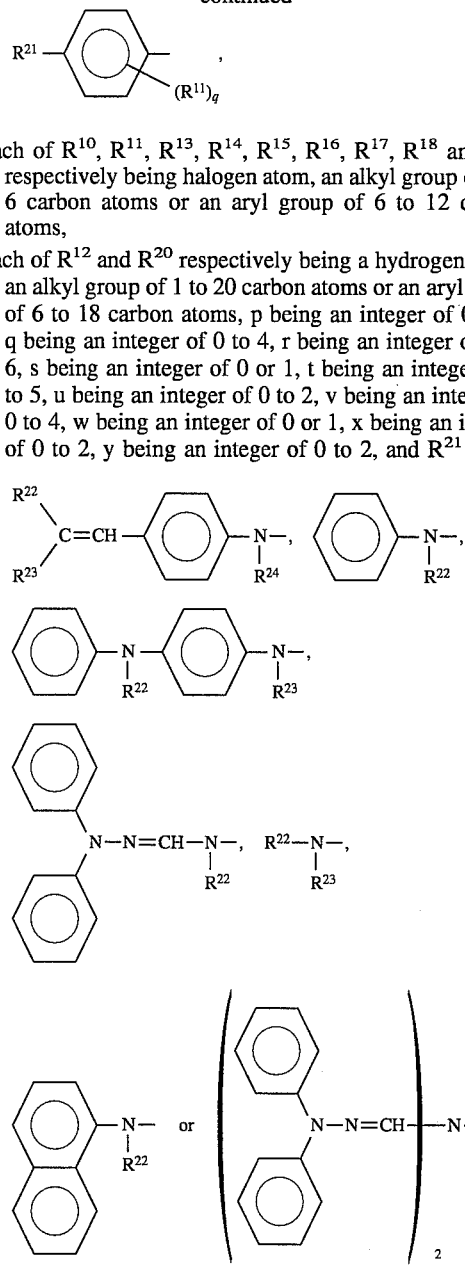

each of $R^{10}$, $R^{11}$, $R^{13}$, $R^{14}$, $R^{15}$, $R^{16}$, $R^{17}$, $R^{18}$ and $R^{19}$ respectively being halogen atom, an alkyl group of 1 to 6 carbon atoms or an aryl group of 6 to 12 carbon atoms, each of $R^{12}$ and $R^{20}$ respectively being a hydrogen atom, an alkyl group of 1 to 20 carbon atoms or an aryl group of 6 to 18 carbon atoms, p being an integer of 0 to 3, q being an integer of 0 to 4, r being an integer of 0 to 6, s being an integer of 0 or 1, t being an integer of 0 to 5, u being an integer of 0 to 2, v being an integer of 0 to 4, w being an integer of 0 or 1, x being an integer of 0 to 2, y being an integer of 0 to 2, and $R^{21}$ being each of $R^{22}$, $R^{23}$ and $R^{24}$ respectively being hydrogen atom, an alkyl group of 1 to 20 carbon atoms or an aryl group of 6 to 18 carbon atoms, each of $R^3$ and $R^4$ respectively is hydrogen atom, an alkyl group of 1 to 10 carbon atoms or an aryl group of 6 to 18 carbon atoms, with the proviso that at least one of $R^3$ and $R^4$ is not hydrogen atom, each of $R^5$, $R^6$ and $R^7$ respectively is an halogen atom, cyano group, nitro group, an alkyl, alkoxyl, alkylamino or dialkylamino group of 1 to 10 carbon atoms, an aryl, arylamino, bisarylamino, bisaralkylamino or alkylarylamino group of 6 to 18 carbon atoms, or a cycloalkyl group of 5 to 7 carbon atoms, $R^8$ is hydrogen atom, an alkyl group of 1 to 10 carbon atoms or an aryl group of 6 to 18 carbon atoms, c is an integer of 0 or 1, d is an integer of 0 to 2, e is an integer of 0 to 3, f is an integer of 0 to 4, g is an integer of 0 to 2, h is an integer of 0 to 3, i is an integer of 0 or 1, j is an integer of 0 to 6, $Z^1$ is $=NR^8$, —S— or —O—, $Z^2$ is =$NR^9$, —S— or —O—, and $R^9$ is hydrogen atom, an alkyl group of 1 to 10 carbon atoms or an aryl group of 6 to 18 carbon atoms, or the repeating units (I) and the repeating units (II) represented by the following general formula (II)

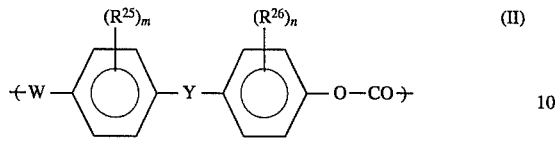

wherein W is —O— or a single bond, each of $R^{25}$ and $R^{26}$ respectively is a halogen atom, an alkyl group of 1 to 6 carbon atoms, a cycloalkyl group of 5 to 7 carbon atoms or an aryl group of 6 to 12 carbon atoms, each of m and n respectively is an integer of 0 to 4, Y is single bond, —O—, —S—, —SO—, —$SO_2$—, $CR^{27}R^{28}$, a 1,1-cycloalkylidene group of 5 to 11 carbon atoms or an α,ω-alkylene group of 2 to 10 carbon atoms, each of $R^{27}$ and $R^{28}$ respectively being hydrogen atom, trifluoromethyl group an alkyl group of 1 to 6 carbon atoms or an aryl group of 6 to 12 carbon atoms, and having a reduced viscosity ($\eta_{sp}/c$) of 0.2 to 10.0 dl/g, measured at 20° C. as a solution of a concentration of 0.5 g/dl in methylene chloride.

2. The polyether polymer of claim 1, wherein X in the general formula (I) is

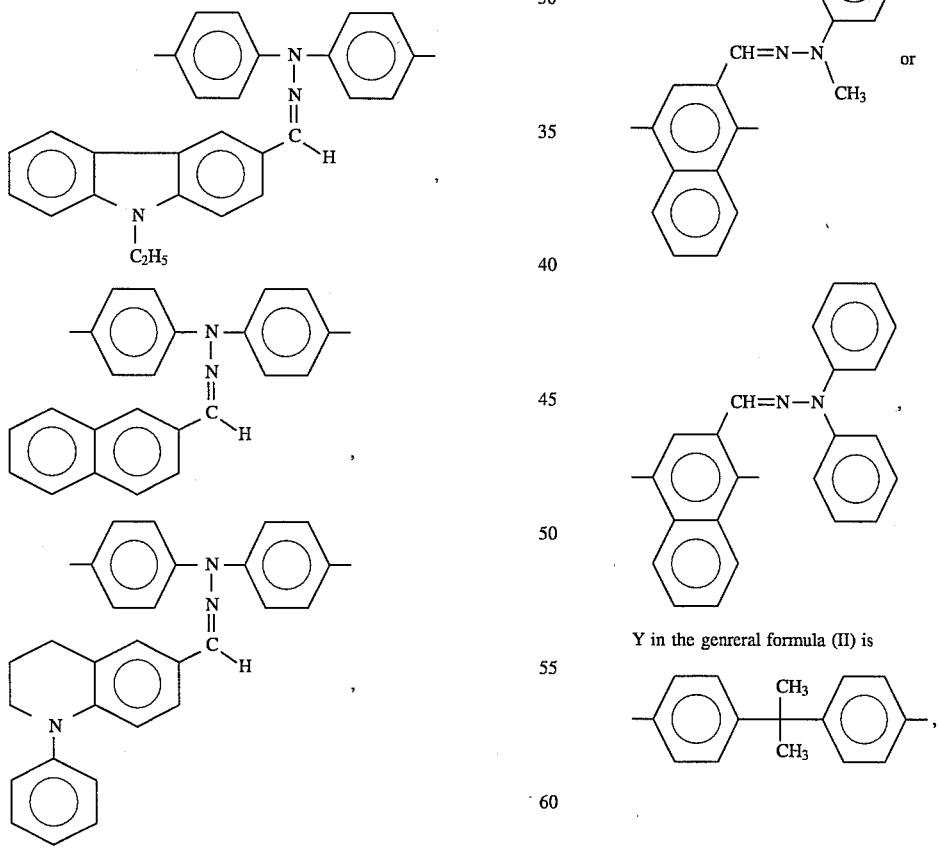

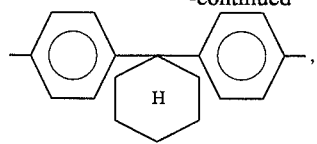
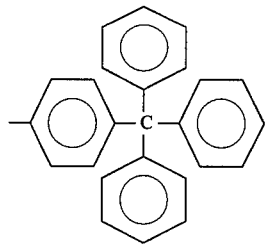
or
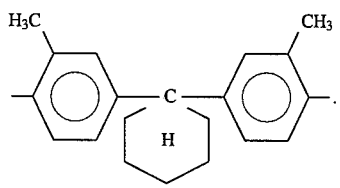
3. The polyester polymer of claim 1 or 2, which is a polycarbonate wherein W in each of the general formulas (I) and (II) is —O—.
4. A method of preparing the polyester polymer of claim 1, comprising allowing a dihydric phenol (III) represented by the following formula (III)
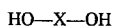     (III)
wherein X is
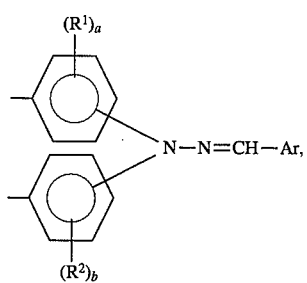
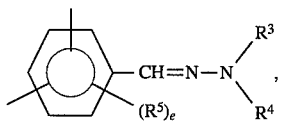
,
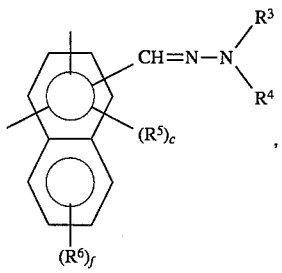
,
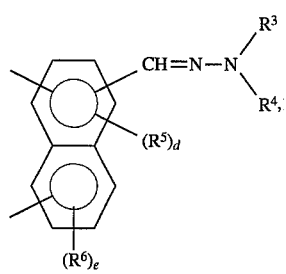
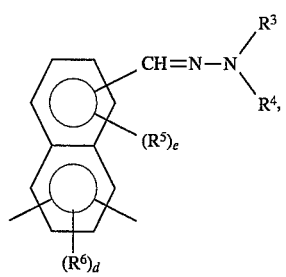
,
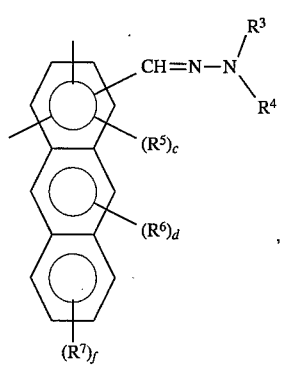
,
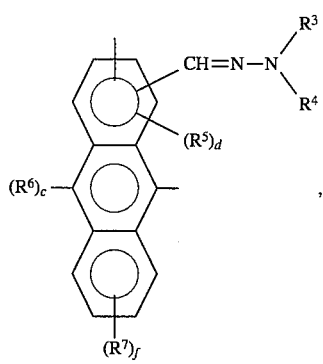
,
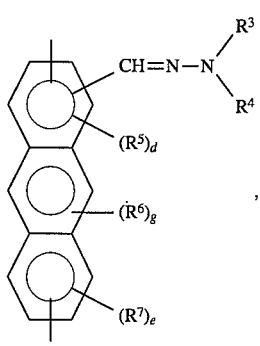
,

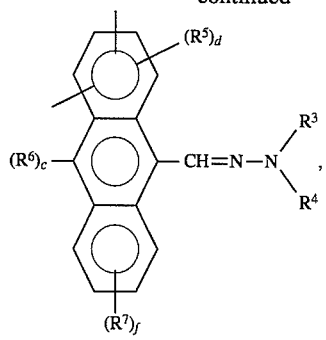
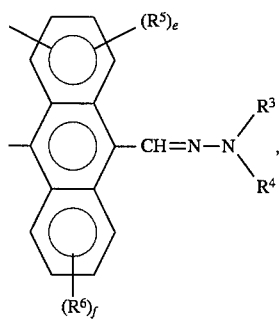
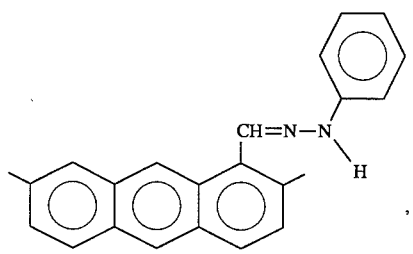
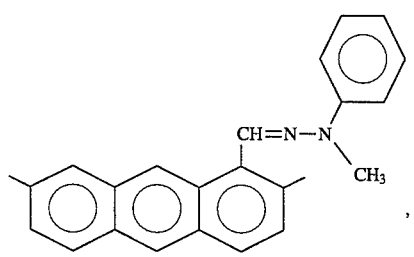
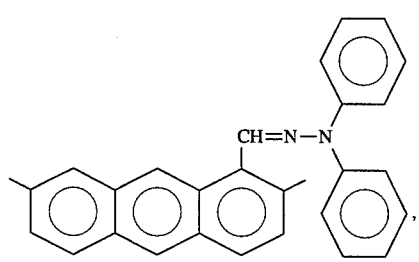
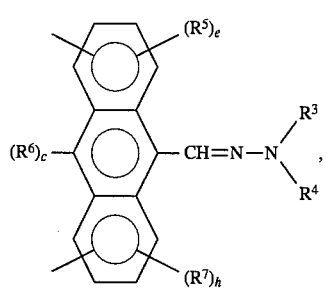
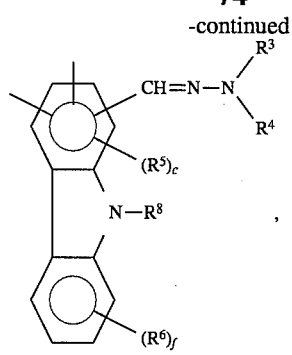
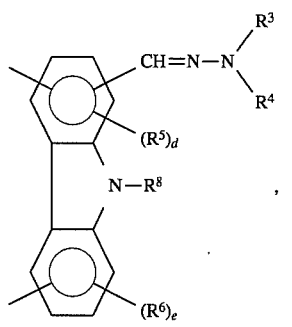
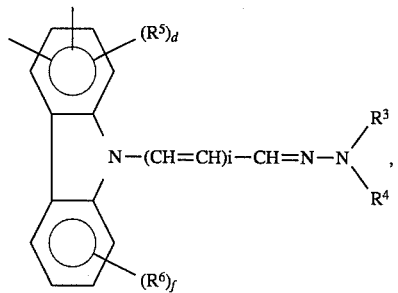
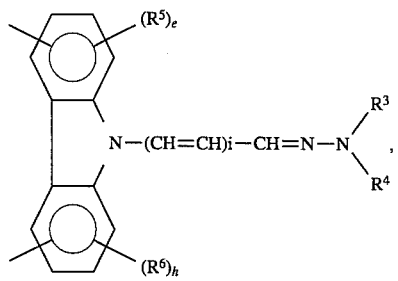
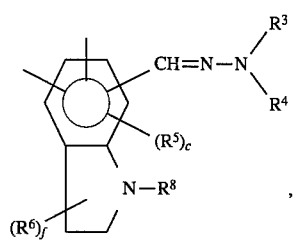
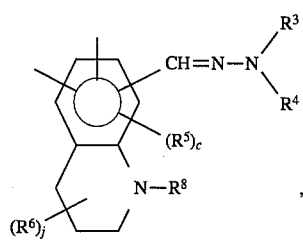

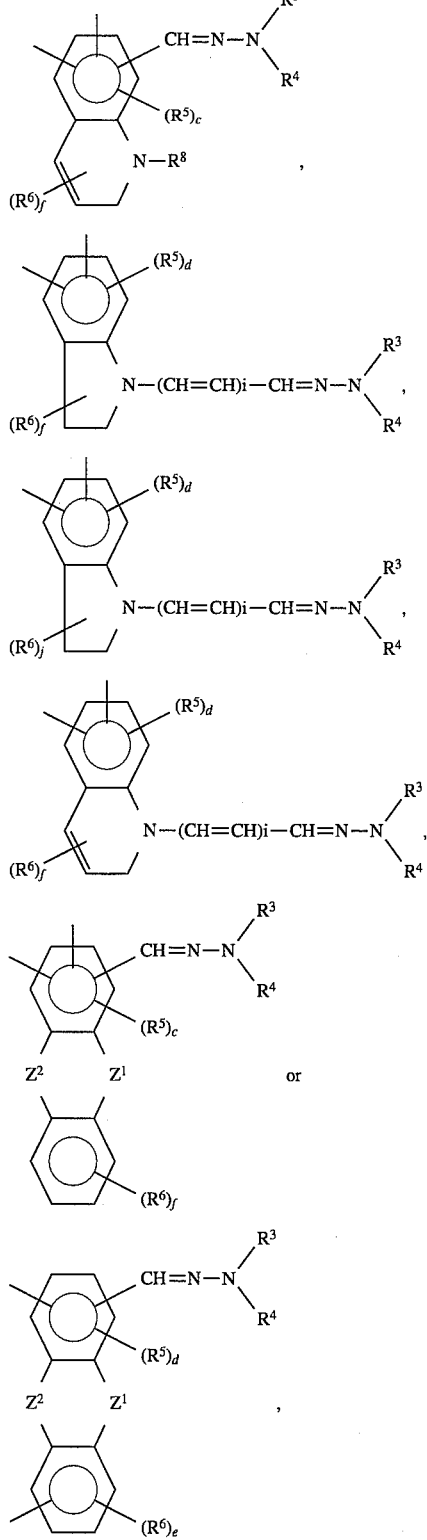
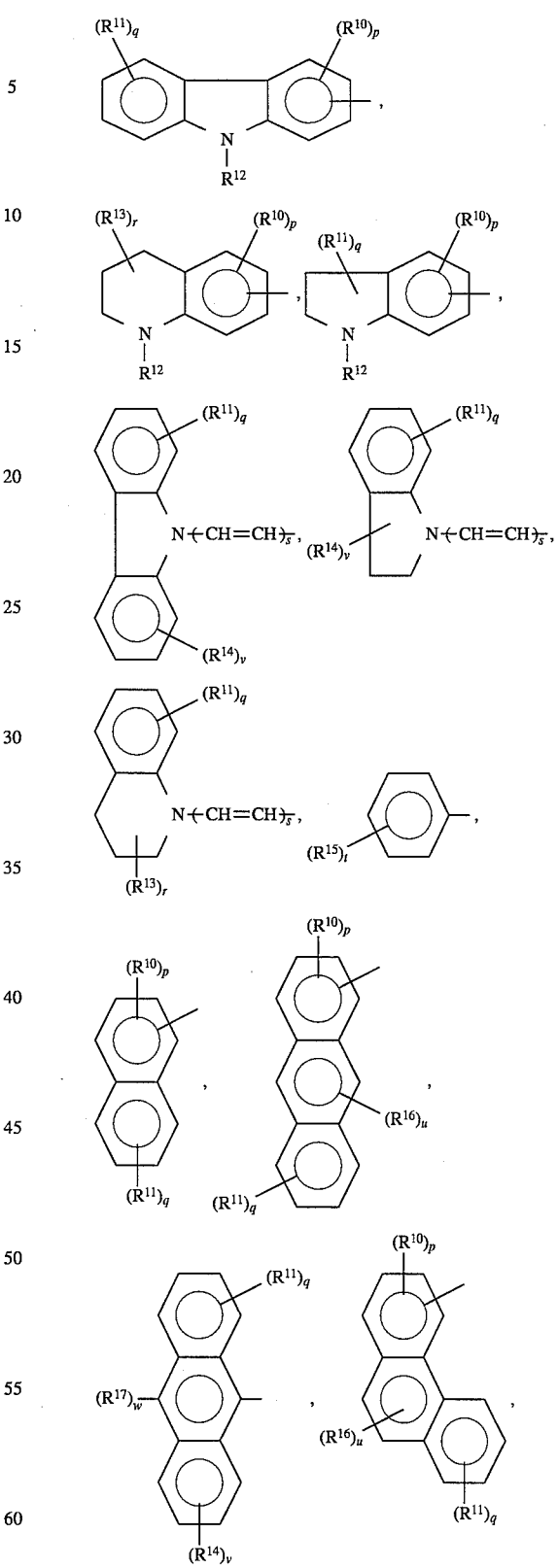
is an integer of 0 to 4, Ar is
wherein each of $R^1$ and $R^2$ respectively is a halogen atom, an alkyl group of 1 to 6 carbon atoms or an aryl group of 6 to 12 carbon atoms, each of a and b respectively

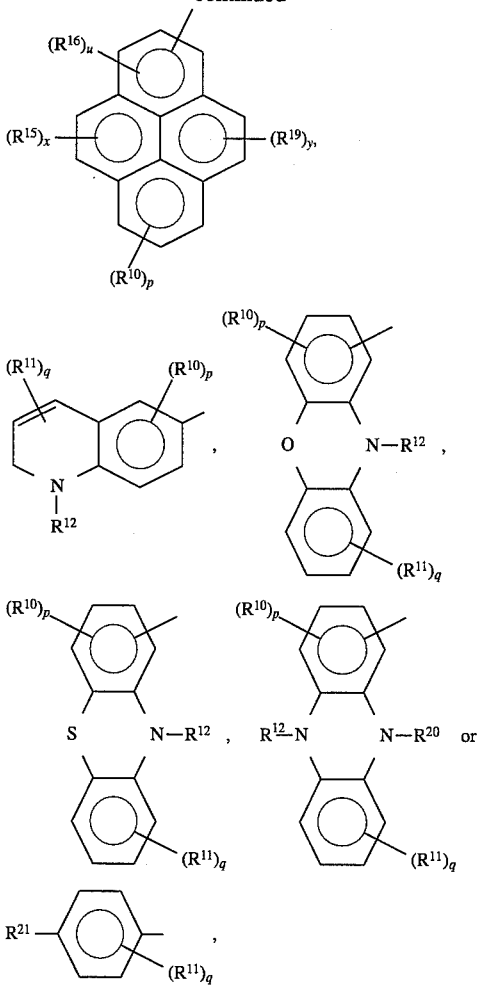

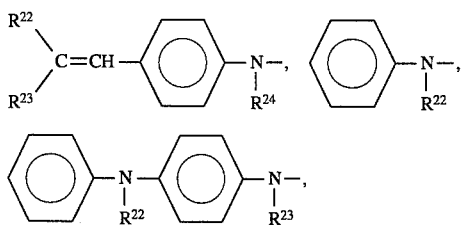

each of $R^{10}$, $R^{11}$, $R^{13}$, $R^{14}$, $R^{15}$, $R^{16}$, $R^{17}$, $R^{18}$ and $R^{19}$ respectively being a halogen atom, an alkyl group of 1 to 6 carbon atoms or an aryl group of 6 to 12 carbon atoms, each of $R^{12}$ and $R^{20}$ respectively being hydrogen atom, an alkyl group of 1 to 20 carbon atoms or an aryl group of 6 to 18 carbon atoms, f being an integer of 0 to 3, q being an integer of 0 to 4, r being an integer of 0 to 6, s being an integer of 0 or 1, t being an integer of 0 to 5, u being an integer of 0 to 2, v being an integer of 0 to 4, w being an integer of 0 or 1, x being an integer of 0 to 2, y being an integer of 0 to 2, and $R^{21}$ being

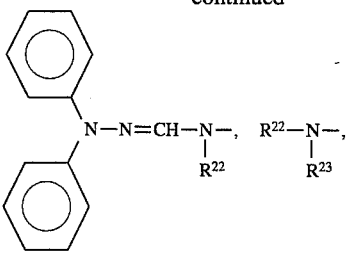

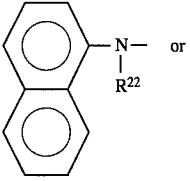

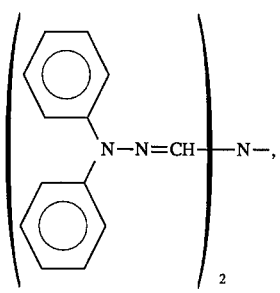

each of $R^{22}$, $R^{23}$ and $R^{24}$ respectively being hydrogen atom, an alkyl group of 1 to 20 carbon atoms or an aryl group of 6 to 18 carbon atoms, each of $R^3$ and $R^4$ respectively is hydrogen atom, an alkyl group of 1 to 10 carbon atoms or an aryl group of 6 to 18 carbon atoms, with the proviso that at least one of $R^3$ and $R^4$ is not hydrogen atom, each of $R^5$, $R^6$ and $R^7$ respectively is an halogen atom, cyano group, nitro group, an alkyl, alkoxyl, alkylamino or dialkylamino group of 1 to 10 carbon atoms, an aryl, arylamino, bisarylamino, bisaralkylamino or alkylarylamino group of 6 to 18 carbon atoms, or a cycloalkyl group of 5 to 7 carbon atoms, $R^8$ is hydrogen atom, an alkyl group of 1 to 10 carbon atoms or an aryl group of 6 to 18 carbon atoms, c is an integer of 0 or 1, d is an integer of 0 to 2, e is an integer of 0 to 3, f is an integer of 0 to 4, g is an integer of 0 to 2, h is an integer of 0 to 3, i is an integer of 0 or 1, j is an integer of 0 to 6, $Z^1$ is $=NR^8$, —S— or —O—, $Z^2$ is $=NR^9$, —S— or —O—, and $R^9$ is hydrogen atom, an alkyl group of 1 to 10 carbon atoms or an aryl group of 6 to 18 carbon atoms, or the dihydric phenol (III) and a dihydric phenol (IV) represented by the following general formula (IV)

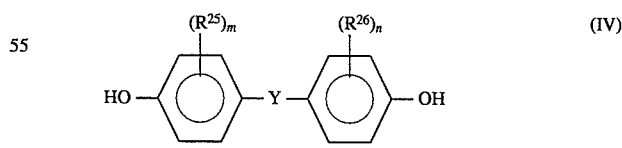

wherein each of $R^{25}$ and $R^{26}$ respectively is a halogen atom, an alkyl group of 1 to 6 carbon atoms, a cycloalkyl group of 5 to 7 carbon atoms or an aryl group of 6 to 12 carbon atoms, each of m and n respectively is an integer of 0 to 4, Y is single bond, —O—, —S—, —SO—, —SO$_2$—, $CR^{27}R^{28}$, a 1,1- cycloalkylidene group of 5 to 11 carbon atoms or an α,ω-alkylene group of 2 to 10 carbon atoms, each of $R^{27}$ and $R^{28}$ respectively being hydrogen atom, trifluoromethyl group an alkyl group of 1 to 6 carbon atoms or an aryl group of 6 to 12 carbon atoms, to react with a carbonate precursor or a dibasic acid.

5. The method of claim 4, wherein X in the general formula (III) is

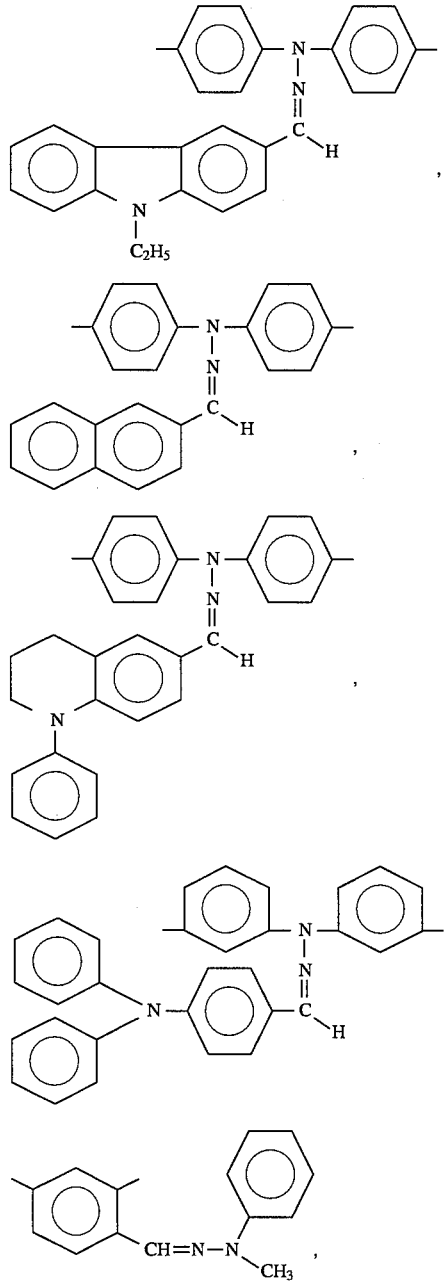

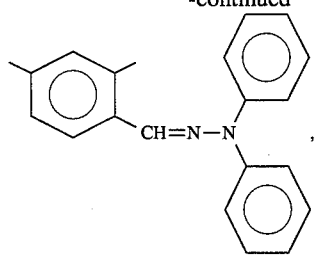

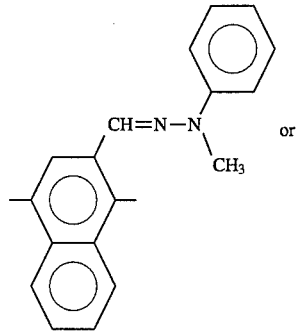

or

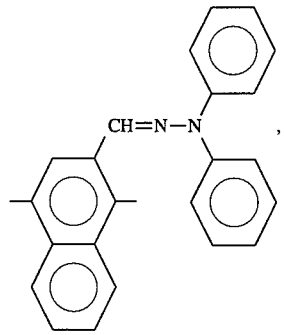

and Y in the general formula (IV) is

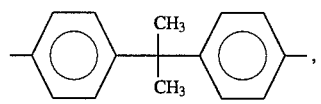

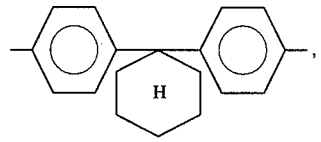

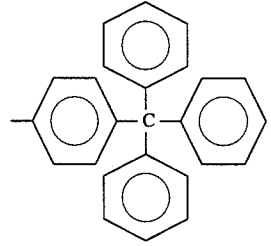

or

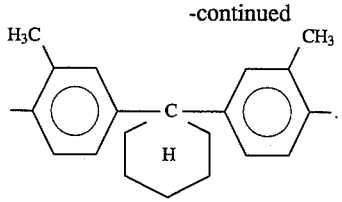
6. The method of claim 4 or 5, wherein a polycarbonate is prepared by allowing the dihydric phenol (III), or the dihydric phenol (III) and the dihydric phenol (IV), to react with the carbonate precursor.
7. The polyester polymer of claim 1, wherein X in the general formula (I) is
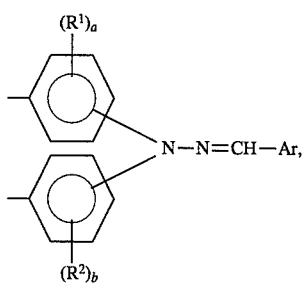
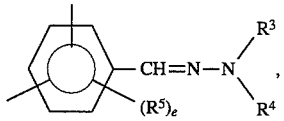
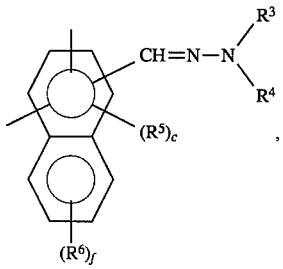
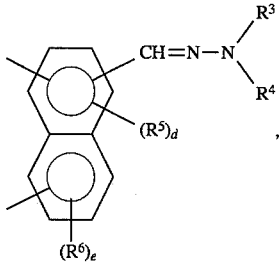
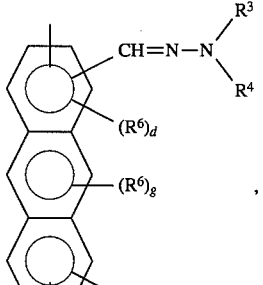
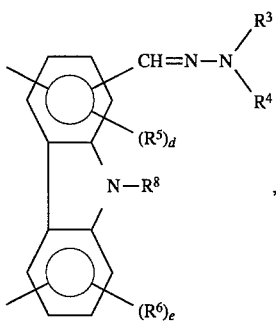
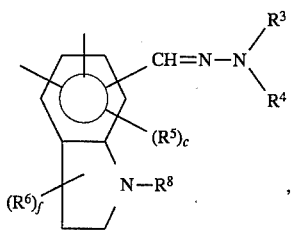
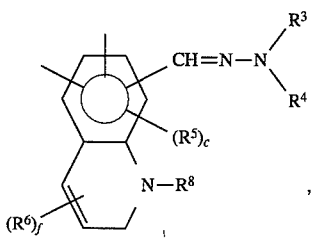
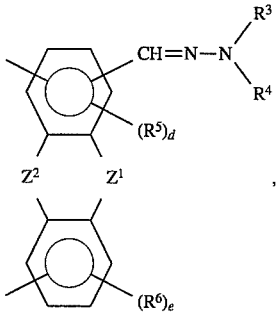
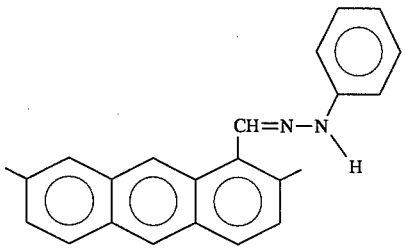
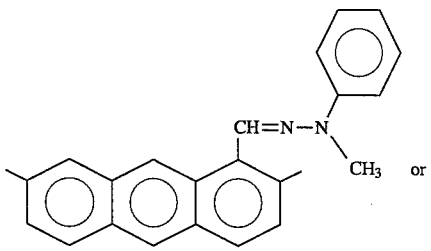 or

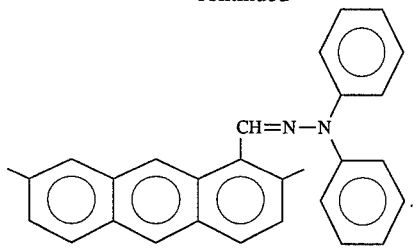
8. The method of claim 4, wherein X in the general formula (III) is
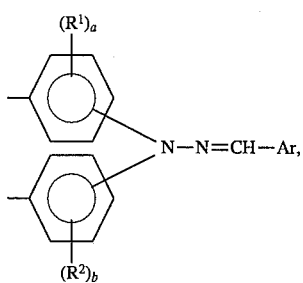
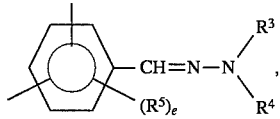
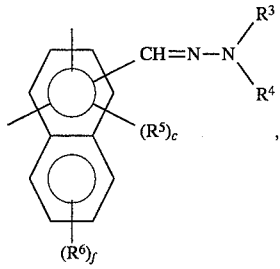
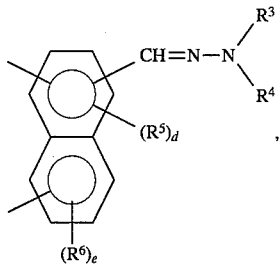
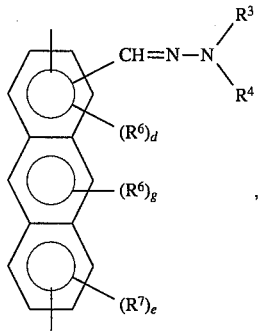
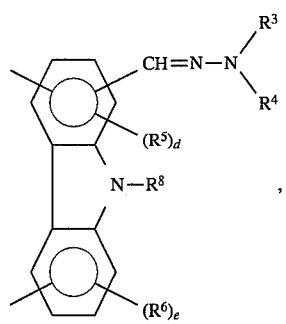
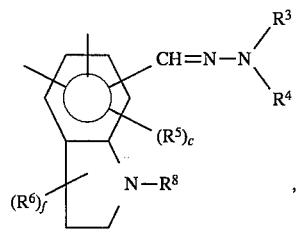
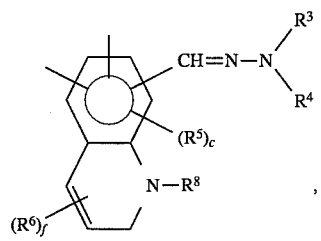
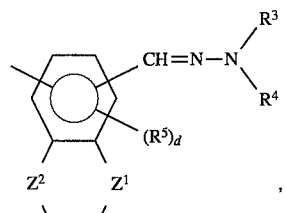
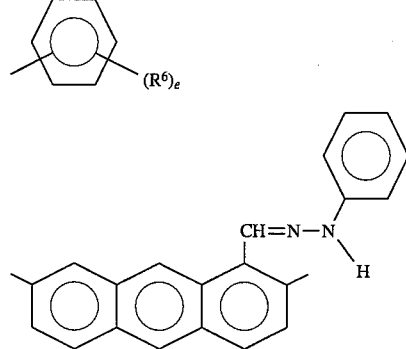

85
-continued
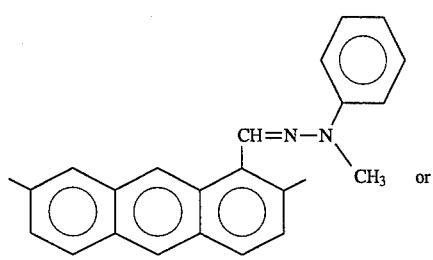
or
86
-continued
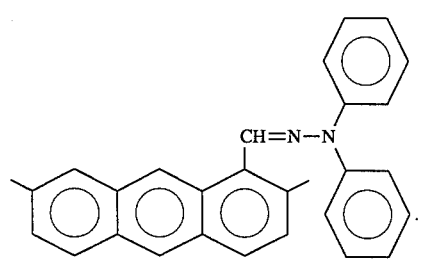
* * * * *